(12) United States Patent
Namihira et al.

(10) Patent No.: US 7,929,550 B2
(45) Date of Patent: Apr. 19, 2011

(54) METHOD FOR OPTIMALLY ROUTING SPECIFIC SERVICE IN NETWORK, AND SERVER AND ROUTING NODE USED IN THE NETWORK

(75) Inventors: Daisuke Namihira, Kawasaki (JP); Yasunori Terasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1561 days.

(21) Appl. No.: 11/248,764

(22) Filed: Oct. 12, 2005

(65) Prior Publication Data
US 2006/0029076 A1     Feb. 9, 2006

(51) Int. Cl.
*H04L 12/28*     (2006.01)
(52) U.S. Cl. ......... 370/401; 370/392; 370/400; 709/201
(58) Field of Classification Search .......... None
See application file for complete search history.

(56) References Cited

U.S. PATENT DOCUMENTS

| | | | |
|---|---|---|---|
| 5,210,748 A | 5/1993 | Onishi et al. | |
| 5,642,352 A | 6/1997 | Ishida et al. | |
| 5,774,660 A * | 6/1998 | Brendel et al. | 709/201 |
| 6,304,913 B1 | 10/2001 | Rune | |
| 6,667,971 B1 * | 12/2003 | Modarressi et al. | 370/352 |
| 6,748,447 B1 * | 6/2004 | Basani et al. | 709/244 |
| 7,185,112 B1 * | 2/2007 | Kuranari et al. | 709/249 |
| 7,254,602 B1 * | 8/2007 | Boivie | 709/201 |
| 7,457,279 B1 * | 11/2008 | Scott et al. | 370/352 |
| 2001/0036164 A1 * | 11/2001 | Kakemizu et al. | 370/331 |
| 2002/0091786 A1 | 7/2002 | Yamaguchi et al. | |
| 2003/0210694 A1 * | 11/2003 | Jayaraman et al. | 370/392 |
| 2004/0153499 A1 * | 8/2004 | Heddaya et al. | 709/202 |
| 2008/0215718 A1 * | 9/2008 | Stolorz et al. | 709/223 |

FOREIGN PATENT DOCUMENTS

| | | |
|---|---|---|
| EP | 1 063 831 | 12/2000 |
| JP | 3-235444 | 10/1991 |
| JP | 6-259308 | 9/1994 |
| JP | 8-79309 | 3/1996 |
| JP | 10-334061 | 12/1998 |
| JP | 11-55321 | 2/1999 |
| JP | 2001-7844 | 1/2001 |
| JP | 2002-140202 | 5/2002 |
| JP | 2002-530014 | 9/2002 |
| JP | 2002-374290 | 12/2002 |
| JP | 2003-374293 | 12/2002 |
| JP | 2003-22226 | 1/2003 |
| JP | 2003-115868 | 4/2003 |
| JP | 2003-152780 | 5/2003 |
| WO | WO 00/28713 | 5/2000 |

OTHER PUBLICATIONS

International Search Report dated Oct. 28, 2003.
Notice of Ground of Rejection dated Apr. 1, 2008, from the corresponding Japanese Application.
Notification of Reason(s) for Refusal mailed Feb. 3, 2009, from the corresponding Japanese Application.

* cited by examiner

*Primary Examiner* — Duc C Ho
(74) *Attorney, Agent, or Firm* — Katten Muchin Rosenman LLP

(57) ABSTRACT

Information (service information) about service contents provided by servers is registered or updated by each of routing nodes by exchanging said information through use of a routing protocol used in controlling a path among the routing nodes. The routing node selectively changes address information about a service access request on the basis of the service information owned by the routing node, to thus route the service access request to an optimal destination. Thereby, concentration of load to a specific service can be efficiently dispersed.

22 Claims, 24 Drawing Sheets

FIG. 5

21: REGISTERED SERVICE TABLE

| LENGTH OF SERVICE IDENTIFIER | SERVICE IDENTIFIER | SERVER ADDRESS | DIRECT ACCESS ADDRESS | SERVICE TYPE | SERVER TYPE | NUMBER OF PORTS | PORT NO. 1 | ... | PORT NO. n | SERVICE EXPIRATION TIME |
|---|---|---|---|---|---|---|---|---|---|---|
| ... | ... | ... | ... | ... | ... | ... | ... | ... | ... | ... |
| ... | ... | ... | ... | ... | ... | ... | ... | ... | ... | ... |

FIG. 11

| LENGTH OF SERVICE IDENTIFIER | SERVICE IDENTIFIER | MASTER ADDRESS | DIRECT ACCESS ADDRESS | OPTIMAL ADDRESS | NUMBER OF PORTS (MASTER) | PORT NO. 1 TO n (MASTER) | NUMBER OF PORTS (OPTIMAL) | PORT NO. 1 TO n (OPTIMAL) | COMPLE-TION OF MASTER |
|---|---|---|---|---|---|---|---|---|---|
| ⋮ | ⋮ | ⋮ | ⋮ | ⋮ | ⋮ | ⋮ | ⋮ | ⋮ | ⋮ |
| . . . | . . . | . . . | . . . | . . . | . . . | . . . | . . . | . . . | . . . |

| ADDRESS (MASTER) | PORT (MASTER) | ADDRESS (OPTIMAL) | PORT (OPTIMAL) |
|---|---|---|---|
| ... | ... | ... | ... |
| . | . | . | . |
| . | . | . | . |
| . | . | . | . |

24

METHOD FOR OPTIMALLY ROUTING SPECIFIC SERVICE IN NETWORK, AND SERVER AND ROUTING NODE USED IN THE NETWORK

CROSS REFERENCE TO RELATED APPLICATIONS

This application is based on and hereby claims priority to PCT international application No. PCT/JP2003/008711 filed on Jul. 9, 2003 in Japan, the contents of which are hereby incorporated by reference.

BACKGROUND OF THE INVENTION (1) Field of the Invention

The present invention relates to a method for optimally routing a specific service in a network, and a server and a routing node which are used in the network. For instance, the present invention relates to a technique, under a circumstance where a server (master) which provides a specific service and a group of servers (mirrors) which reflect the same service contents as those provided by the server and provide the same service content by means of another server are present, the technique being suitable for making an access to a server considered to be optimal by a terminal, without the terminal becoming aware of positions (addresses) and operating status conditions of the servers.

(2) Description of the related Art

Current measures against a circumstance—where servers providing various services in a network, such as the Internet, are present and where accesses concentrate on a service—is a method for providing only identical service contents from another server located physically distant from the current server in the network and causing a user to select a destination and make an access to the destination. There is also a method for transferring an access to an optimal destination among load balancers connected to a server which provides a specific service.

According to the former method, the user must know the location of an appropriate service. Although there is also a location where a list of services is provided, a choice is left to the user, and therefore a problem of failure to attain efficient distribution of load exists. Moreover, information concerning which one of the servers in the list suspends provision of a service is not provided as well, and hence another problem of occurrence of a failure to obtain the service to which an access has been made also arises. In order to cause the terminal to automatically ascertain the information, the volume of information which must be collected becomes enormous, and hence automatic ascertainment of the information is practically impossible.

In contrast, according to the latter method, the load balancer must ascertain specifics of a server connected to the load balancer. However, even when a server is additionally provided, the load balancer does not automatically recognize the added server. For this reason, information concerning the added server must be provided to the load balancer. Moreover, when the load balancers are remotely located in the network, an optimal destination may change according to the status of the network. Since the load balancers do not ascertain the internal status of the network, there may arise a case where effective distribution of loads cannot be realized.

In addition, techniques proposed in Patent Documents 1 and 2, which are provided below, are available as conventional techniques.

The technique described in Patent Document 1 is for newly providing an attribute pertaining to band information to a routing protocol; notifying a border router in a network of band information concerning traffic having flowed in from another network, in conjunction with the routing information; and notifying a border router of another network of band information concerning traffic having flowed out from the network. As a result, according to the technique of Patent Document 1, band information, which can be input, can be automatically notified to all border routers with a small capital investment and minor adaptations, thereby saving labor of a network administrator and preventing occurrence of human errors.

Meanwhile, the technique described in Patent Document 2 relates to a method for managing a distribution-type database. On the basis of a server information management table into which a plurality of servers are classified (grouped) according to applications (services), a server is selected. At that time, a load table may be provided for each server, and a server having the lowest load may be selected. Alternatively, a table concerning service conditions of storage mediums (disks, tapes, or the like) of a plurality of servers may be provided, and a server having the largest available disk space selected. In addition, an application-specific information retrieval key and a server ID where information is to be stored have been registered as a retrieval-key-and-server-ID table in a storage management server. On the basis of only one service request from a user, the user can utilize a required service without becoming aware of the server.

Patent Document 1
JP-2002-374293A
Patent Document 2
JP-HEI6-259308A

However, according to the technique described in Patent Document 1, a band of a network can be managed. However, control operation for distributing loads cannot be performed by changing an access address to a server on which accesses are concentrated.

According to the technique described in Patent Document 2, an optimal server can be selected in accordance with the load of a server and the availability of storage capacity. Information concerning what type of a server is available as a database and information concerning natures of information items belonging to respective servers must be previously stored in the server information management table. Specifically, loads of the servers and the availability of storage capacity are mere objects of updating.

In the world of a network, this technique is identical with the method that has already been put into practice by means of the above-described load balancers. Therefore, the technique encounters the same problem as that mentioned previously. Patent Document 2 discloses that the server information management table can also be given to the router. However, even when a router is simply given server management information, the network cannot uniquely select an optimal destination without sharing or updating information concerning a group of servers in the network by automatically ascertaining the information and without the user becoming aware of service contents currently provided in the network and operating conditions.

The present invention has been conceived in view of the problems set forth and aims at enabling sharing and updating of information (positional information, service operation status conditions, or the like) concerning a group of servers in a network by automatically ascertaining the information within the network (a router or the like), and enabling the network to uniquely select an optimal destination without a user becom-

SUMMARY OF THE INVENTION

In order to achieve the object, a method for optimally routing a specific service in a network having a plurality of servers and a plurality of routing nodes which route service access requests to the servers in accordance with address information assigned to the service access requests, the method comprising:

registering and updating service information pertaining to service contents provided by the server at each routing node by means of exchanging the service information through use of a routing protocol used in controlling a path among the routing nodes; and each of the routing nodes selectively changing address information about the service access request on the basis of the service information owned by the routing node, to thus route the service access request to an optimal address.

The service information including a service identifier showing the type of a service provided by the server may be registered or updated in each of the routing nodes through use of the routing protocol. Each of the routing nodes may route the service access request for every service type on the basis of the service identifier.

A URL (Uniform Resource Locator) can also be used as the service identifier.

Further, the server can also notify the routing node connected to the server of a service operating status of the server, by means of a service operation status notification message; the routing node can also update the service information owned by the routing node according to a service operation status notified by means of the service operation status notification message; and an update of the service information can also be transmitted to and reflected on the respective routing nodes in the network by means of the routing protocol.

The server can also transmit a service update message to the routing node connected to the server, every time the service contents provided by the server are updated; the routing node can also delete registration of the service information about the service contents when the routing node does not receive the service update message from the server for a predetermined period of time; and deletion of the service information can also be transmitted to and reflected on respective routing nodes in the network by means of the routing protocol.

Further, even when the service update message is not received for the predetermined period of time, the routing node can also maintain registration of service information about service contents which are objects of non-updating.

When a network includes a master server and a mirror server as the server for providing identical service contents, the master server can also periodically notify a routing node connected to the master server of the service operation status notification message. When the routing node determines, based on the service operation status notification message, that the master server has stayed inactive for a predetermined period of time, registration of the service information about the mirror server can also be deleted, and deletion of the service information can also be transmitted to and reflected on the respective routing nodes in the network by means of the routing protocol.

In addition, each of the routing nodes can also monitor the operation status of another routing node by monitoring receipt of dead/alive ascertainment information to be periodically received from the other routing node, through use of the routing protocol. When the other routing node is ascertained to be inactive, service information about the other, inactive routing node among pieces of service information owned by the routing node can also be deleted, and deletion of the service information can also be transmitted to and reflected on each routing node in the network by means of the routing protocol.

When the network includes a master server and a mirror server as the server for providing identical service contents, the mirror server can also transmit an access request used for updating service contents provided by the mirror server to a routing node connected to the mirror server, and the routing node can also convert address information about the access request into direct access address information which enables direct access to the master server, thereby routing the access request data.

A server used in a network of the present invention is characterized by a server used in a network having a plurality of servers, and a plurality of routing nodes for routing service access requests to the server in accordance with address information assigned to the service access requests, the server comprising:

service notification means for notifying a routing node connected to the server of service information pertaining to service contents provided by the server; and service operation status notification means for notifying the routing node of the service operation status of the server.

The service notification means may be configured to have service update notification means for, when the service contents are updated, notifying the routing node of information pertaining to the updated service contents.

When a mirror server which provides service contents identical with those provided by the server exists separately from the server, the mirror server may further comprise direct access address information notification means which notifies the routing node connected to the server of direct access address information for enabling direct access to the server when service contents provided by the mirror serer are updated.

A routing node used in a network of the present invention is characterized by a routing node used in a network having a plurality of servers, and a plurality of routing nodes for routing service access requests to the server in accordance with address information assigned to the service access requests, the routing node comprising:

service information management means for managing registration and updating of service information pertaining to service contents provided by the routing node upon receipt of the service information from a server connected to the routing node or another routing node;

service information transmission means which transmits the service information to an additional routing node through use of a routing protocol used in controlling a path among the routing nodes, in response to registration and updating of the service information performed by the service information management means; and routing control means which selectively changes address information about the service access request on the basis of the service information in the service information management means, to thus route the service information to an optimal address.

The service information management means may be configured to maintain or manage the service information including a service identifier showing a type of a service provided by the server; and the routing control means may be configured to route the service access request for every service type on the basis of the service identifier.

The service information management means preferably maintains and manages a URL (Uniform Resource Locator) as the service identifier.

Moreover, the service information management means may comprise means for updating the service information according to a service operation status of the server provided by the server.

The service information management means may have means for deleting registration of service information about the service contents when a service update message, which is to be issued every time the service contents provided by the server are updated, has not been received from the server for a predetermined period of time.

The service information management means may have means for maintaining registration of service information about service contents, which are objects of non-updating, even when the service update message has not been received for the predetermined period of time.

When the network includes a master server and a mirror server as the server for providing identical service contents, the service information management means may comprise means for determining whether or not the master server remains inactive for a predetermined period of time, by means of a service operation status notification message periodically issued by the master server; and means for deleting registration of the service information about the mirror server of the service information management means when the master server is determined to be inactive.

In addition, the service information management means may comprise means for monitoring operation status of another routing node by monitoring receipt of dead/alive ascertainment information to be periodically received from the other routing node by means of the routing protocol; and means for deleting service information about the inactive other routing node, among pieces of service information retained by the service information management means, when nonoperation of the other routing node is ascertained through the monitoring operation.

When the network includes a master server and a mirror server as the server for providing identical service contents, the service information management means may comprise means for requesting direct access address information which enables direct access to the master server when service contents provided by the mirror server to the master server are updated; and means for transmitting the direct access address information to be received from the master server in response to the request to another routing node including the service information.

Moreover, the routing control means may have address conversion means for converting into the direct access address information address information concerning an access request received from the mirror server.

BRIEF DESCRIPTION OF THE DRAWINGS

FIG. 5 is a view showing an example registration service table used in the present embodiment;

FIG. 11 is a view showing an example destination server selection table employed in the present embodiment;

FIG. 13 is a view showing an example destination change table employed in the present embodiment;

DESCRIPTION OF THE PREFERRED EMBODIMENTS

Figure 1:
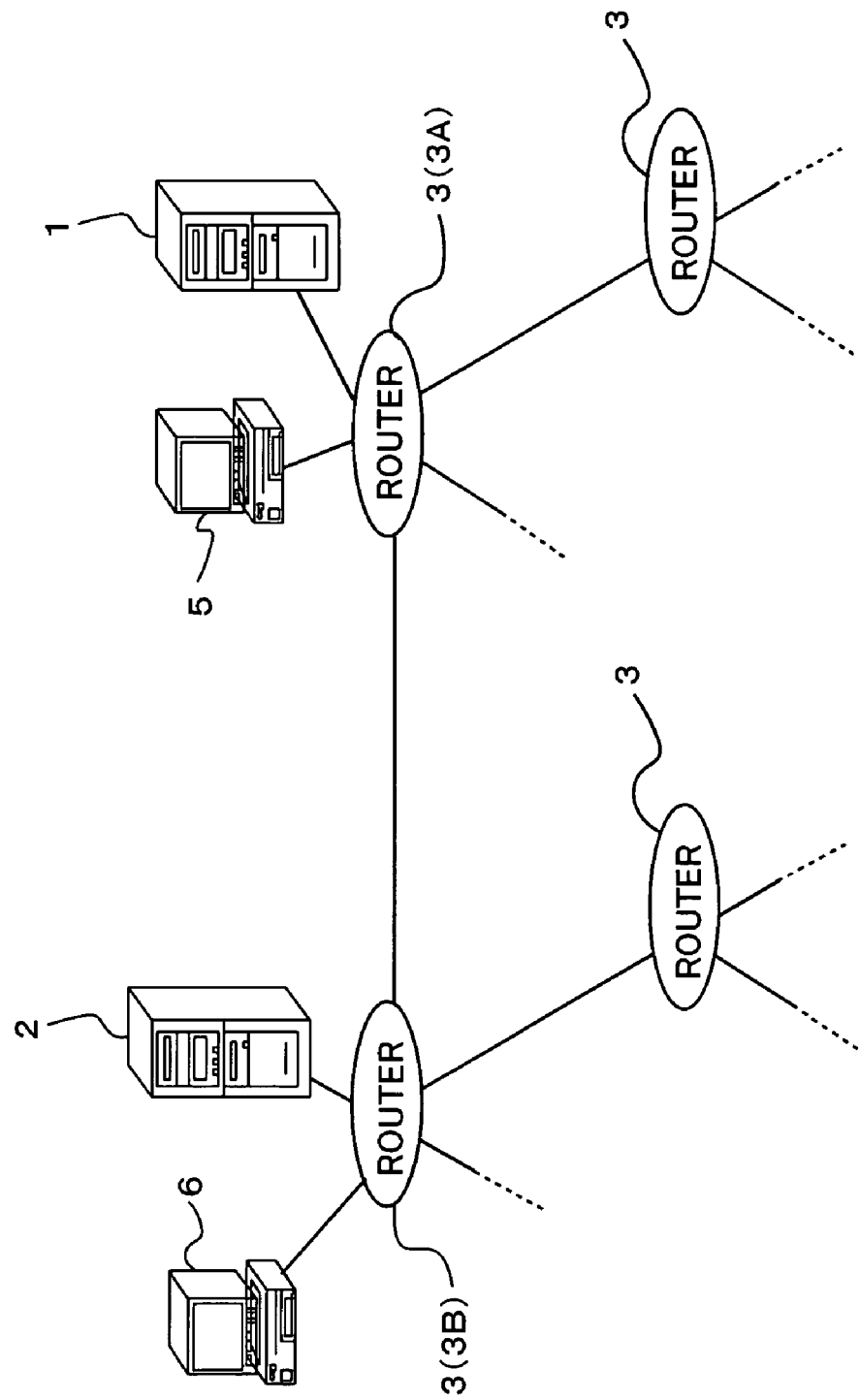
FIG. 1 is a block diagram showing a network configuration according to an embodiment of the present invention.

FIG. 1 is a block diagram showing a network configuration according to an embodiment of the present invention. A network shown in FIG. 1 comprises a plurality of servers 1, 2; a plurality of routers (routing nodes) 3; and a plurality of user terminals (hereinbelow also called simply "terminals") 5, 6. In this case, the server 1 and the user terminal 5 are connected to a router 3A, and the server 2 and the user terminal 6 are connected to a router 3B. In the following descriptions, when the routers 3A and 3B are not distinguished from each other, they are denoted as "routers 3."

Each of the servers 1, 2 provide the user terminals (hereinafter also called simply "terminals") 5, 6 with a certain specific service. For instance, the server 1 is taken as a master server, and the server 2 is taken as a mirror server which provides the same service contents as those provided by the master server 1. FIG. 1 illustrates only two servers, two routers, and two user terminals. However, as a matter of course, the number of the servers, the number of the routers, and the number of the user terminals are not limited to those shown in FIG. 1.

In the present embodiment, information concerning a service provided by way of a network (information concerning the natures of services provided by the servers 1, 2 or the like) is also added to a control message which is used in exchanging route information among the routers 3 in accordance with a predetermined routing protocol, such as a BGP4 (Border Gateway Protocol Version 4) or the like.

As a result, the entire network can ascertain locations of respective services so that the router 3 can perform relay (routing) to an optimal destination. By means of addition of operation status conditions of the routers 3 to the existing control messages exchanged among the routers 3, the operation status conditions can be directly or indirectly ascertained, and an optimal destination can also be changed by reference to the information.

Further, the servers 1 and 2, which provide services, transmit the type of the service provided by the servers and the operation status conditions of the servers to the routers 3A, 3B connected to the servers 1, 2. As a result of the routers 3, 4 ascertaining the service types and the operation status conditions, the routers 3A, 3B in the network can automatically ascertain addition of a server or the like, and determination of an optimal destination can be performed after addition of a server or the like. The routers 3A, 3B monitor only the status conditions of the servers 1, 2 connected thereto. In relation to servers connected to the other routers 3, status conditions are acquired from the service information added to the control messages exchanged among the routers 3. Accordingly, there is no necessity for ascertaining and managing all the servers in the network through use of a single device, and processing for ascertaining the servers does not involve consumption of an enormous time.

Such an optimal routing method of the present embodiment will be described hereinbelow in detail. First will be described a method by means of which the routers 3A, 3B ascertain service contents provided by the servers 1, 2. Next will be described specifics of additional information (notification of service contents) concerning a routing protocol exchanged among the routers 3 and a method for exchanging the additional information.

[A] Notification of Service Contents Provided by a Server, and a Method for Notifying Operation Status Conditions First, a protocol ASRP (Application Services Registration Protocol) exchanged between the server 1 (or 2) and the router 3A (or 3B) connected to the server 1 (or 2) is defined. The server 1 (or 2) having a service which is desired to be registered establishes a TCP (Transmission Control Protocol) connection with the router (a router supporting the ASRP) 3A (3B) connected to the network by way of the server 1 (or 2). Any TCP port number is available for the ASRP, unless the TCP port number is known (Well-Known). For instance, an unoccupied (unassigned) port number "4634" is used.

Figure 2:
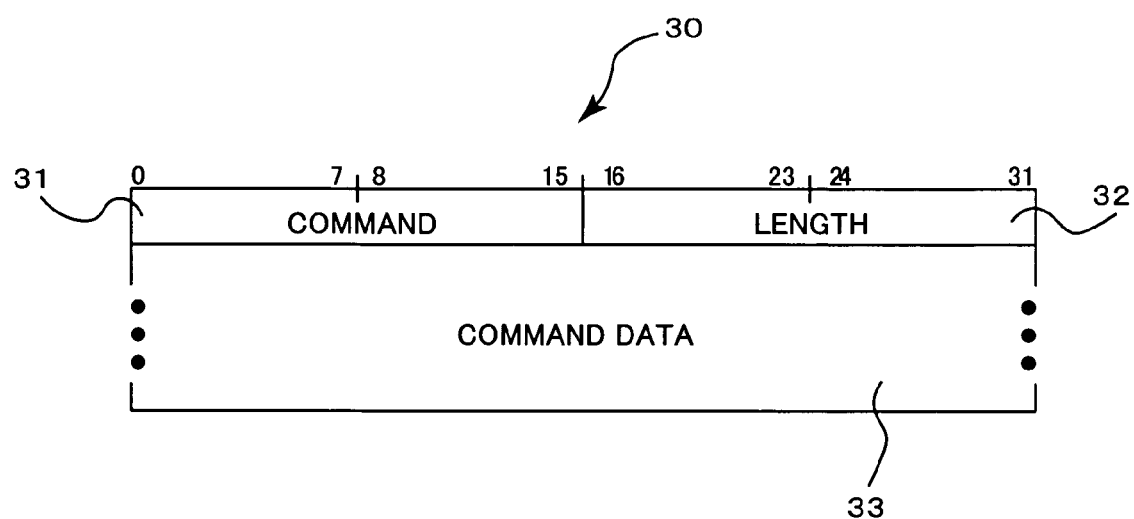
FIG. 2 is a view showing an example format of an ASRP packet used in the present embodiment.

After establishment of the TCP connection, the server 1 (or 2) issues a command (packet) to be defined by use of the ASRP to the router 3A (or 3B), to thus notify the router of the status and type, or the like, of the service. The command packet format of the ASRP is defined as shown in, e.g., FIG. 2. Specifically, a command packet 30 comprises a command field 31 (two octets) showing the type of the command; a length field 32 (two octets) showing the length of data following the command field 31; and a "command data" field 33 (of variable length) in which required parameters, or the like, are stored according to the type of a command.

The following seven types are defined in connection with the command (message).

1. ADD_SERVICE (Command Value: 1)

Figure 3:
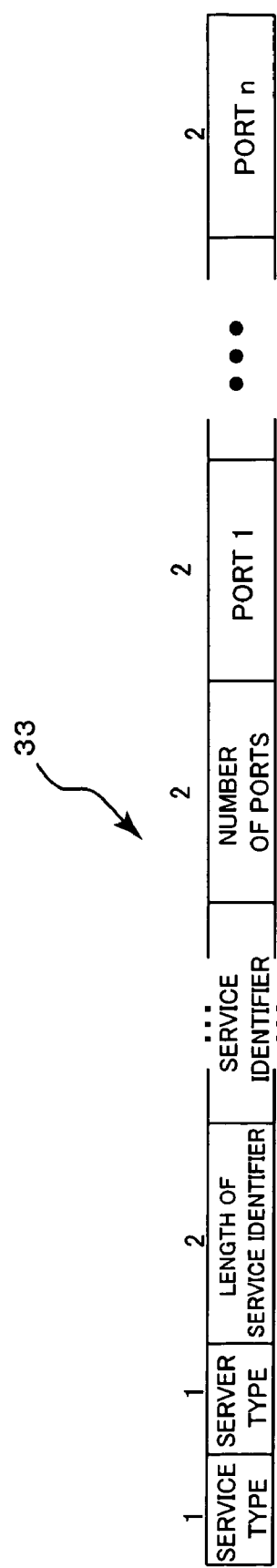
FIG. 3 is a view showing an example of command data format of an ADD_SERVICE message of the ASRP used in the present embodiment.

A command for notifying service contents provided by the servers 1, 2 of interest. A length value is variable, and contents of command data are defined as shown in FIG. 3. As shown in FIG. 3, in the case of the ADD_SERVICE command, the following various parameters are set in the command data field 33.

(1) Service Type (One Octet)

This parameter shows the type of a service. Only bit 0 is defined. For instance, when bit 0 assumes a value of "0," the parameter represents a service which is not an object of service content update processing. When bit 0 assumes a value of "1," the parameter represents a service which is an object of service content update processing. The service content update processing is processing for providing an update of provided service contents when the provided service contents have been updated. The service content update processing is used for determining the service operation status conditions of the routers 3A, 3B.

(2) Server Type (One Octet)

For example, numeral "1" shows that a server of interest is the master of a service of interest, and numeral "2" shows that the current server is a mirror server.

(3) Length of a Service Identifier (Two Octets)

The length of the next service identifier is stored.

(4) Service Identifier (of Variable Length)

This parameter represents the type of a service provided by the server 1 (2). A value which enables unique ascertainment of service contents provided by the server 1 or 2 is stored. By way of an example, a URL (Uniform Resource Locator), such as "http://www.foo.bar/" for the case of a WWW server, may be used. Even when the "service type" represents a "mirror," contents of an URL provided by the master server 1 are stored. Thereby, the service can be identified to be identical with that provided by the master server 1.

(5) Number of Ports (Two Octets)

The number of port numbers provided through the service (the value of "n" in Port 1 to port "n" provided below) is stored.

(6) Port Numbers 1 to "n" (Each of which Corresponds to Two Octets)

The parameter shows a port number provided by the service By way of an example, 80 is stored for the case of an http (hyper text transfer protocol).

2. KEEPALIVE (a Command Value: 2)

A message used for reporting that the server 1 (2) of interest is in operation. The length value of this message is assumed to be 0 (command data includes no contents).

3. SERVICE_DOWN (Command Value: 3)

Figure 4:
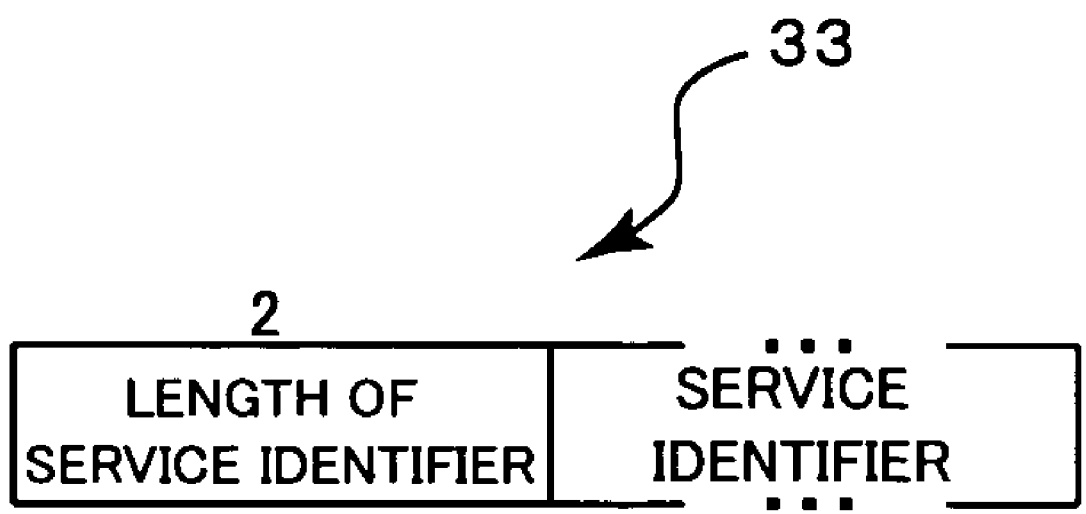
FIG. 4 is a view showing an example of command data format of a SERVICE_DOWN message of the ASRP used in the present embodiment.

This is a message used for reporting occurrence of service down when the specific service provided by the server 1 (2) of interest has gone down for any reason. The length value of this message is variable, and contents of the command data are defined as shown in, e.g., FIG. 4. Specifics of the respective types of parameters shown in FIG. 4 are identical with those acquired in the case of the above-described ADD_SERVICE command.

4. CLOSE_SERVER (Command Value: 4)

This is a message to be issued when the server 1 (2) has become unable to provide a service for reasons of shutdown or the like. The length value of this message is assumed to be 0 (command data include no contents).

5. SERVICE_UPDATE (Command Value: 5)

This is a message to be issued only in connection with a service whose contents are to be updated. Notification is sent when contents of the service provided by the server 1 (2) of interest have been dated. The length value of this message is assumed to be 0 (command data include no contents).

6. DIRECT_ADDR_REQ (Command Value: 6)

Only this message is transmitted from the router 3A (or 3B) to the server 1 (or 2). This is a message for requesting a direct access address (which will be described later) of the master server 1. The length value of the message is assumed to be 0 (command data include no contents).

7. DIRECT_ADDR_RESP (Command Value: 7)

This is a message in response to DIRECT_ADDR_REQ, and a direct access address is returned when the server of interest is the master server 1. The length of the direct access address is stored in the length value of this message, and specifics of the direct access address are stored in contents of the command data.

The above-described term "direct access address" is a dummy address for enabling the mirror server 2 to make a direct access to the master server 1. When the master server 1 is booted up, at least one direct access address is prepared by the server 1. This "direct access address" must be an address used by neither the user terminal 5 nor the user terminal 6. Incidentally, a subnet identical with a subnet determined by the address of the master server 1 is given to the direct access address during designation of the direct access address. The reason for this is that the address of the master server 1 and the direct access address must be routed in a single direction.

Namely, the servers 1, 2 of the present embodiment have at least the following features.

(1) A function of serving as a service notification section which notifies a router 3 of information concerning service contents provided by the servers 1, 2 of interest by generating an ADD_SERVICE message and issuing the thus-generated message to the router 3 connected to the servers 1, 2.

(2) A function of serving as a service operation status notification section which notifies the router 3 of service operation status conditions of the servers 1, 2 of interest by generating the above-described KEEPALIVE, SERVICE_DOWN, and CLOSE_SERVER messages and issuing the thus-generated messages to the router 3.

(3) A function of, when service contents have been updated, serving as a service update notification section which notifies the router connected to the servers 1, 2 of interest of information concerning updated service contents by use of the SERVICE_UPDATE message.

(4) A function of acting as a direct access address notification section which, in a case where the mirror server 2 providing the same service contents as those provided by the server 1 of interest exists outside the server 1, notifies the router 3 connected to the server 1 of a direct access address which enables a direct access to the server 1, by use of the DIRECT_ADDR_RESP message when the service contents provided by the mirror server 2 are updated.

Operation effected (after setting of the TCP connection) by the ASRP of the server 1 (2) is as follows:

(1) First, the ADD_SERVICE packet is transmitted to the router 3 in connection with all the services provided by the server 1 (2) of interest.

(2) Subsequently, the KEEPALIVE message is periodically transmitted.

(3) When the server 1 (2) of interest has ascertained that a certain service is suspended, a SERVICE_DOWN packet is transmitted.

(4) When the server 1 (2) of interest has ascertained that the server will be suspended by shutdown or the like, a CLOSE_SERVER packet is transmitted.

(5) When the provided service is an object whose service contents are to be updated and when the service contents have been updated, the SERVICE_UPDATE packet is transmitted.

(6) When the DIRECT_ADDR_REQ message is received from the router 3 and when the master server is included in the service provided by the server 1 (2) of interest, the direct access address is stored in the DIRECT_ADDR_RESP message, and the message is transmitted to the router 3.

A registration service table 21; for example, that shown in FIG. 5, is provided to the router 3. Respective parameters shown in FIG. 5 are identical with contents in the ADD_SERVICE packet of the above-described ASRP. Here, the "server address" is a source address of the packet that has received ADD_SERVICE. Moreover, the "service expiry time" includes a time when service contents are to be updated and a time when an entry is excluded from service objects. In relation to the entry which falls outside the objects, numeral 0 is stored in this area.

The following flags are now defined.

(1) Service Content Update Processing Flag

This flag is a value which can be set by the user. This flag specifies whether or not service contents are updated (numeral "1" for a case where service contents are updated, and numeral "0" for a case where service contents are not updated).

(2) Service Content Expiry Time

This flag is a value which can be set by the user. This flag sets a time from when service contents are updated until when the service contents are ascertained to be "expired."

When the router 3 has received the ADD_SERVICE packet from the server 1 (2), an entry is added to the registration service table 21. However, in the case of an entry for which the service identifier and the server address coincide with each other, contents of the entry are updated. When the service content update processing bit in the ADD_SERVICE packet is "1" and when the service content update processing execution flag is "1," a time—determined by addition of a service content expiry time to the current time—is set in the "service expiry time" in the registration service table 21. In other cases, the "service content expiry time" is set to 0.

Next, when the "server type" in the ADD_SERVICE packet is a "master," the DIRECT_ADD_REQ message is transmitted to the source server 1 (2). A response to the DIRECT_ADD_REQ message (DIRECT_ADDR_RESP message) is awaited. When a response has been received, the "direct access address" set in the received message is stored in a "direct access address" field in the entry of the currently-added registration service table 21 (see FIG. 5).

Subsequently, the router 3 (4) checks arrival of the KEEPALIVE packet with regard to all the servers to which the connection is set. When the KEEPALIVE packet cannot be received for a given period of time, all entries having the address value of the server in the server address value are deleted from the registration service table 21. When the CLOSE_SERVER packet is received from the server 1 (2), processing identical with that which is performed when the KEEPALIVE packet cannot be received for a given period of time is performed.

When the SEVICE_DOWN packet is received from the server 1 (2), entries—having the same "service identifier" as that included in the SERVICE_DOWN packet and the same source address as that included in the SERVICE_DOWN packet received by the "server address"—are deleted from the registration service table 21.

When the service content update processing execution flag is "1," the following processing is additionally performed. Specifically, when the SERVICE_UPDATE packet is received from the server 1 (2), entries—which have the same "service identifier" as that included in the SERVICE_UPDATE packet and whose "server address" is identical with the source address of the SERVICE_UPDATE packet—are retrieved from the registration service table 21. The service expiry time in the entries is changed to a time determined by addition of a service content expiry time to the current time. All entries of the registration service table 21 are retrieved, and entries for which a service expiry time is set and the expiry time has passed are deleted.

Through the foregoing operations, all the service contents pertaining to the server 1 (2) connected to a certain router 3 are registered in the registration service table 21 of the router 3. Further, the contents are updated appropriately in accordance with the operation status of the service.

[B] Exchange of Service Information Among Routers

A method for exchanging service information among the routers 3 will now be described.

A routing protocol used for determining a destination (path control) is usually exchanged among the routers 3. In the present embodiment, BGP4 (Border Gateway Protocol Version 4), which is a routing protocol used on the Internet, is expanded, and the service information concerning the respective servers 1, 2 acquired by the above-described ASRP is added to the protocol.

More specifically, BGP4 can describe a "path attribute," which represents features of a path for routing information (path information) reported among the routers 3, for each path. Consequently, service information is exchanged by additionally describing, in the path attribute, the service information acquired by the ASRP. Thus, the service information provided by the servers 1, 2 is transmitted to the respective router 3 in the network, and is eventually shared among the routers 3.

Figure 6:
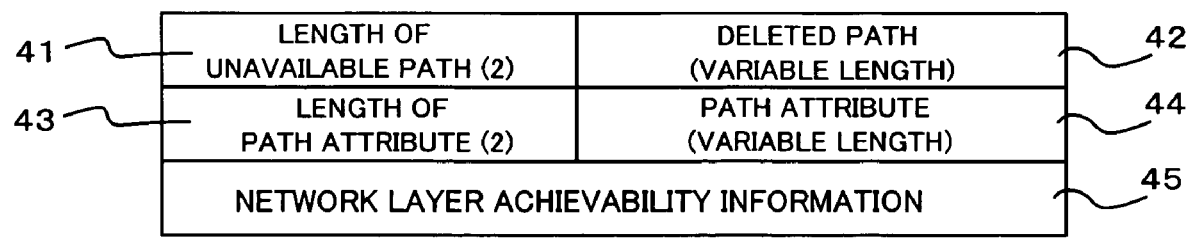
FIG. 6 is a view showing an example format of an UPDATE message of BGP4 used in the present embodiment.

FIG. 6 is a view showing an example format of an update (UPDATE) message used in reporting the route information by the BGP4. As shown in FIG. 6, the UPDATE message includes an unavailable path length field 41 (two octets), a canceled path field 42 (variable length), a path attribute length field 43 (two octets), a path attribute field 44 (variable length), and a network-layer arrivability information field 45.

The field length of the canceled path field 42 is to be stored in the unavailable path length field 41. Information concerning paths having been made unavailable is to be stored in the canceled path field 42. The field length of the path attribute field 44 is to be stored in the path attribute length field 43. Information representing features of a path is to be stored in the path attribute field 44 (in the present embodiment service information is added to this field). Information concerning available paths is to be stored in the network layer arrivability information field 45.

Figure 7:
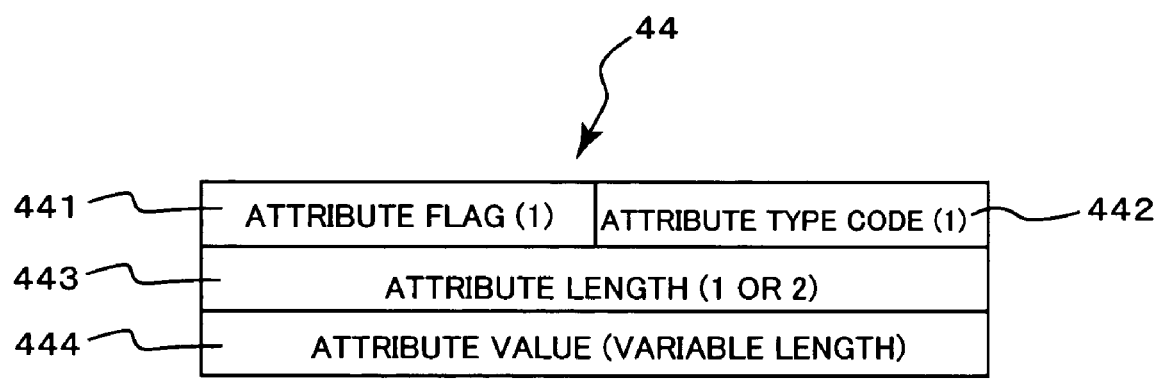
FIG. 7 is a view showing an example path attribute format of the UPDATE message shown in FIG. 6.

FIG. 7 shows an example format of the path attribute field 44 in FIG. 6. As shown in FIG. 7, the path attribute field 44 is formed from an attribute flag field 441 (one octet), an attribute type code field 442 (one octet), an attribute length field 443 (one or two octets), and an attribute value field 444 (variable length). In FIG. 7, contents of service information are to be stored in the attribute value field 444 (details of the contents will be described later). The other fields are defined as follows:

(1) Attribute Flag Field 441

Each bit has a meaning. Set points required when contents and an attribute of service information are defined as follows.

(a) Bit 0: Optional Bit

Numeral "0" denotes "well-known," and shows an attribute which all the routers 3 supporting BGP4 must be able to comprehend. Numeral "1" denotes "optional," and shows an attribute which is not necessarily known by all the routers 3. Since the contents of service information are defined by addition, this bit is set to "1."

(b) Bit 1: Pass-Through Bit

Numeral "0" denotes non-pass-through, and shows that the router 3 which does not support this attribute deletes the attribute. Numeral "1" denotes pass-through, and shows that the router 3 which does not support this attribute allows passage and transmission of the attribute. Since the service information must be passed to all the routers 3, this bit is set to "1."

(c) Bit 2: Pass-Through Bit

This bit is set to "1" when the router 3 cannot understand and has allowed passage of this attribute.

(d) Bit 3 (length of an attribute length field): When this bit is "0," the "attribute length" field is of one-octet length. When this bit is "1," the "attribute length" field is of two-octet length. This field is determined according to the length of the value of the attribute.

(e) Bits 4 to 7 (unassigned): These bits are set to "0" at all times.

(2) Attribute-Type Code Field 442

This field shows the type of an attribute. In BGP4, one to ten are defined for this field in the case of "well-known," and 14 to 16 are defined for this field in the case of "optional." In order to describe attributes of service information, several additional attributes are required. Type codes other than the values that have already been defined are uniquely set. Details of the type code will be described later.

Path information reported by means of the UPDATE message of BGP4 is basically messages integrated on a per-AS (Autonomous System)-unit basis. Naturally, a plurality of servers which provide various types of services are considered to exist in the thus-integrated network. When a plurality of services are available in each integrated path, an UPDATE message for that path is issued several times, to thus report all of service information items.

When the registration service table is updated by ASRP, an UPDATE message including updated service contents is notified to peer routers 3. Thereby, the updated service contents are reflected on the peer routers 3, and the service information owned by the respective routers 3 in the network can be updated (synchronized).

Next, an attribute type code and an attribute value, both of which are additional attributes and are required when a certain service information item is notified, are defined as shown in Table 1 provided below. Although attribute-type code values of the respective attributes are defined, the values are not limited to these definitions and may be defined in any manner, so long as the values are wholly determined uniquely.

TABLE 1

Attribute-type codes and Attribute values of Additional attributes

Figure 8:
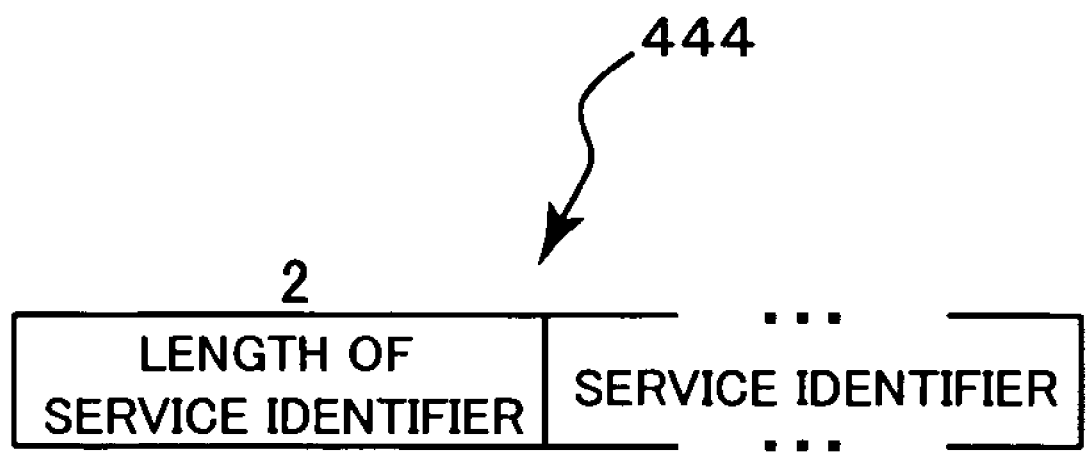
FIGS. 8, 9, and 10 are views showing an attribute type code of an additional attribute of the UPDATE message shown in FIG. 7 and an example format of the attribute values.
Figure 9:
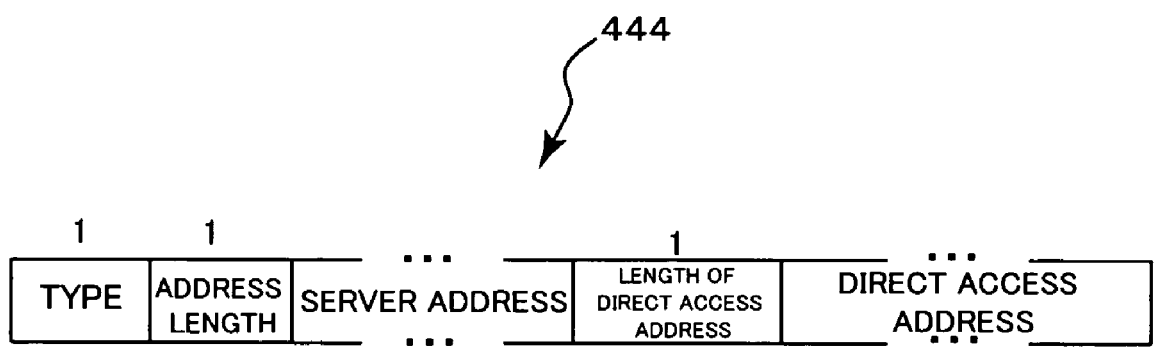
Figure 10:
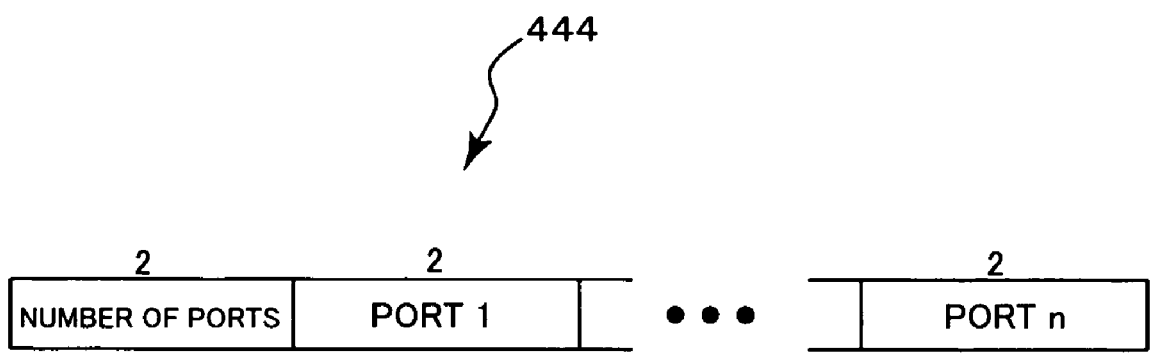

| ATTRIBUTE NAME | ATTRIBUTE-TYPE CODE | ATTRIBUTE VALUE |
|---|---|---|
| APP_ID (SERVICE ID INFORMATION) | 224 | A format is defined as shown in FIG. 8. Specifics of each field are as follows: "Service identifier length" → "Service identifier length" of a registration service table (see FIG. 5) "Service identifier" → "Service identifier" of a registration service table |
| APP_ATTR_ADDR (SERVER ADDRESS INFORMATION) | 225 | A format is defined as shown in FIG. 9. Specifics of each field are as follows: "Type" shows the type and updated specifics of an address. Two bits provided below are effective, bit 0: "0" shows that a service of interest has been updated. "1" shows that a service of interest has been deleted, bit1: "0" shows an address of a master server, and "1" shows an address of a mirror serer. "Address length" shows the length of the next address field. "Address" corresponds to a server address of a registration service table "Direct access address length" shows the length of an address for direct access. "Direct access address" corresponds to the "direct access address" of the registration service table. |
| APP_ATTR_PORT (PORT INFORMATION) | 226 | A format is defined as shown in FIG. 10. Specifics of each field are as follows: "Number of ports" corresponds to "number of ports" in the registration service table. "Ports 1 to n" corresponds to "Ports 1 to n" of the registration service table. |

When the service information is reported, the three types of attributes provided above are inevitably set, and the thus-set attributes are reported to the peer routers 3. Thus, service information items are respectively ascertained by all the routers 3 capable of comprehending expansion.

[C] Method for Determining and Updating an Optimal Path for Every Service on the Basis of Service Information A method by means of which the router 3 determines and updates an optimal path for every service from the service information acquired from the above-described messages will now be described.

In order to retain optimal path information of all service information items reported to the router 3, the router 3 is provided with a destination server selection table 22, such as that shown in FIG. 11. All the service information items acquired by the router 3 are brought together in this destination server selection table 22, and service load distribution processing is performed on the basis of this information. Specifics of respective fields of the destination server selection table 22 are as follows:

(1) Service Identifier Length/Service Identifier

Information corresponds to "service identifier length" and "service identifier" of the registration service table 21 (see FIG. 5).

(2) Master Address

Information corresponds to "server address" of the registration service table 21.

(3) Direct Access Address

Information corresponds to "direct access address" for the master server 1.

(4) Optimal Address

Information corresponds to "server address" of the registration service table 21. In each service, an optimal destination address for the router 3 of interest is specified.

(5) Number of Ports (Master)/Port Numbers 1 to n (Master)

Information corresponds to "Number of ports" and "port number 1 to port number n" of the registration service table 21. Port information about the master server 1 in each service is specified.

(6) Number of Ports (Optimal)/Port Numbers 1 to n (Optimal)

Information corresponds to "number of ports" and "port number 1 to port number n" of the registration service table 21. Port information concerning an optimal destination address in each service is specified.

(7) Master Expiry (Expire) Time

A service expiry (expire) time acquired when the master server 1, which provides a service, is ascertained to have stopped. If the master server 1 is not stopped, 0 is set in this area. Details of this area will be described later.

When the UPDATE message has been transmitted from a peer router or when specifics of the registration service table of the router 3 of interest have been updated, each router 3 updates the specifics of the destination server selection table 22 (or adds/updates a service).

Figure 15:
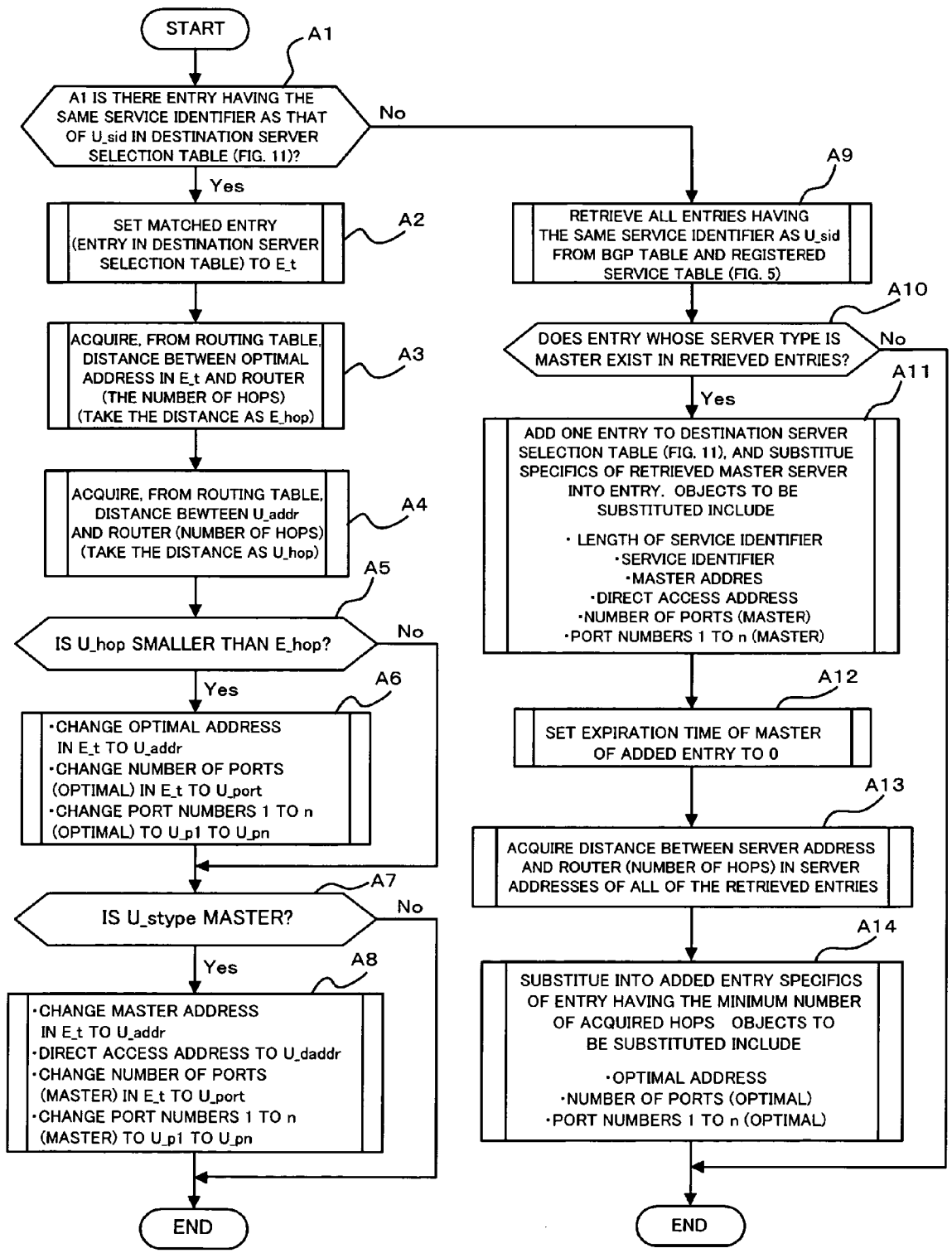
FIG. 15 is a flowchart for describing processing for addition or updating of service information in a router of the present embodiment.

Specifically, as shown in, e.g., FIG. 15, when an addition is made to the specifics of the registration service table 21 or when the UPDATE message is received from the peer router 3 and type information of the APP_ATTR_ADDR attribute value of the message is "update" (these information items will hereinbelow be called "updated data"), the router 3 makes a retrieval as to whether or not the service identifier of the update data is present in the destination server selection table 22 (step A1).

When the service identifier is present (when Yes is selected in step A1), a coincident entry (an entry in the destination server selection table 22) is taken as E_t (step A2), and a distance between an optimal address in the entry E_t and the router 3 of interest (number of hops: a distance to the destination) is acquired from the routing table (which is taken as E_hop) (step A3).

The server address (U_addr) in the entry E_t of the destination server selection table 22 determined through the above-described retrieval and the distance to the router 3 of interest (the number of hops) are acquired from the routing table (are taken as U_hop) (step A4). The thus-acquired two numbers of hops E_hop and U_hop are compared with each other (step A5).

Consequently, when the number of hops U_hop is smaller than the address of the updated data (when Yes is selected in step A5), information concerning the optimal address, the number of ports (optimal), and the port numbers 1 to "n" (optimal) in the entry E_t of the corresponding destination server selection table 22 is rewritten by information included in the updated data [optimal address=U_addr, number of ports (optimal)=U_port, and port numbers 1 to "n"=U_p1 to U_pn] (step A6). When the number of hops E_hop is larger than the address of the updated data (when No is selected in step A5), rewriting is not performed, and existing registered specifics are maintained.

Next, a check is made as to whether or not the "server type" in the updated data is "master" (step A7). When the "server type" is "master," specifics in the entry E_t of the corresponding destination server selection table 22; namely, the master address, the direct access address, the number of ports (master), and the port numbers 1 to "n" (master), are rewritten by specifics of the updated data [master address=U_addr, direct access address=U_daddr, number of ports (master)=U_port, and port numbers 1 to "n" (master)=U_p1 to U_pn] (step A8). When the "server type" is not "master" but "mirror" (when No is selected in step A7), rewriting is not performed, and existing registered specifics are maintained.

Meanwhile, when the "service identifier" of the updated data is not in the destination server selection table 22 (when No is selected in step A1), all entries having the "service identifier" identical with the "service identifier" included in the updated data are retrieved from the BGP table and the registration service table 21, and entries whose "server type" is "master" are retrieved from the thus-retrieved entries (steps A9, A10). The "BGP table" is a table where all the path information items (including attribute specifics added to Table 1) received from the peer routers 3 by means of BGP4 are stored.

Consequently, if there is a corresponding entry (when Yes is selected in step A10), one entry is added to the entries of the destination server selection table 22. The added entry is set in the specifics of the entries for which specifics have been retrieved; that is, a service identifier length, a service identifier, a master address, a direct access address, the number of ports (master), and port numbers 1 to "n" (master) (step A11). When no corresponding entry is found (when No is selected in step A10), processing is terminated.

Subsequent to the processing in step A11, the router 3 sets a master expiry time of the added entry to 0 (step A12). A distance to the router 3 of interest (the number of hops) is acquired from the routing table at the server addresses of all retrieved entries (step A13). A minimum entry is retrieved from the thus-acquired number of hops; and specifics, i.e., an optimal address, the number of ports (optimal), and port numbers 1 to "n" (optimal), all belonging to the added entry in the destination server selection table 22, are set in specifics of the entry having the minimum number of hops (step A14).

In contrast, when the specifics of the registration service table 21 are deleted or when the UPDATE message is received from peer routers 3 and type information concerning the APP_ATTR_ADDR attribute value in the message is "delete" (this information is hereinbelow called "deleted data"), the following service deletion processing is performed. A service identifier, a server address, and a service type of a deleted service are called D_sid, D_addr, and D_stype, respectively.

Figure 16:
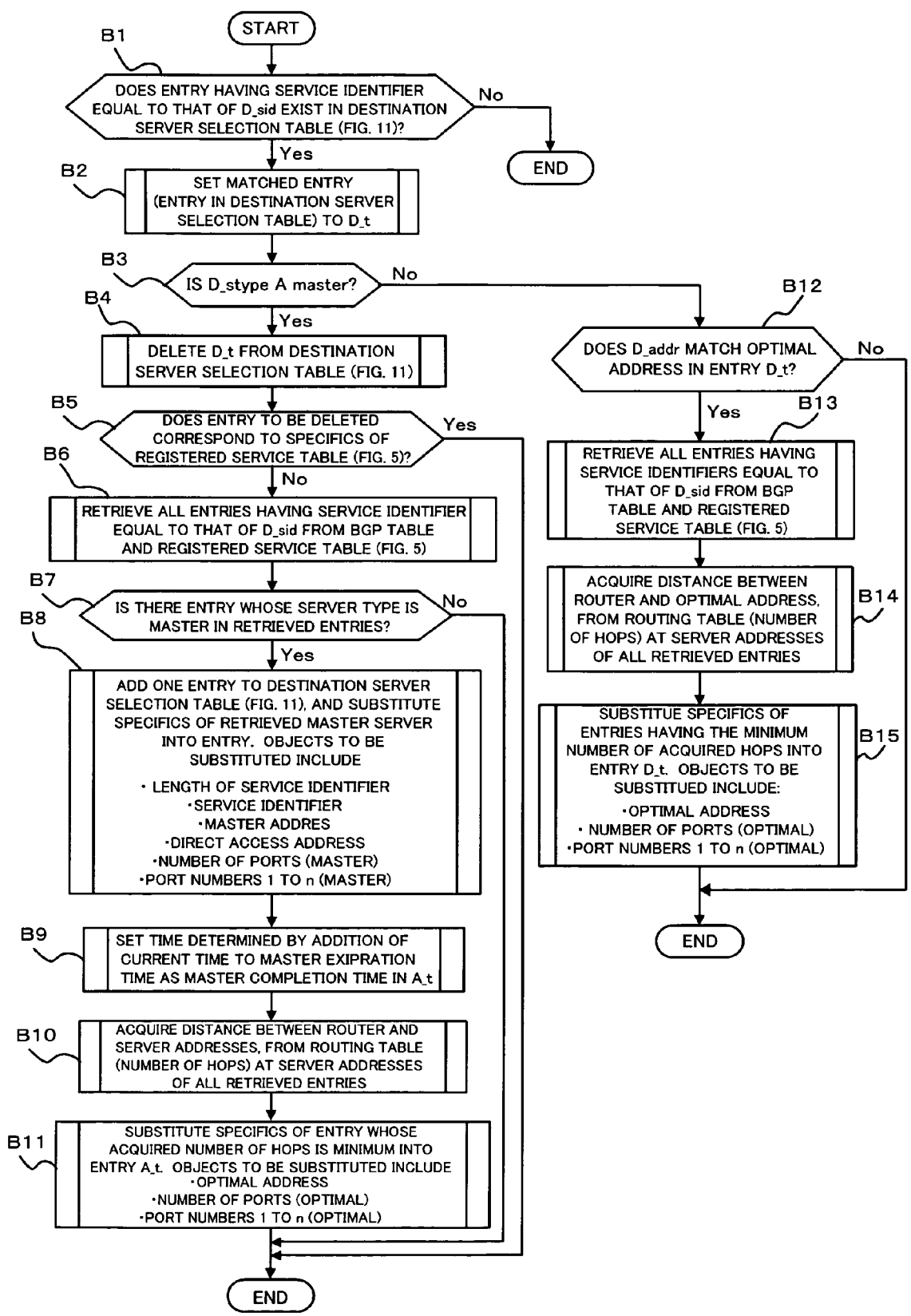
FIG. 16 is a flowchart for describing processing for deleting service information in the router of the present embodiment.

For instance, as shown in FIG. 16, the entries of the destination server selection table 22 are retrieved, to thus check whether or not an entry (D_t) matching the service identifier (D_sid) of the deleted data is present in the destination server selection table 22 (step B1). If no such entry is found, processing is terminated (when No is selected in step B1). If an entry D_t is present (from Yes in step B1 to step B2), a check is made as to whether or not the server type of the deleted data is "master" (step B3).

Consequently, when the server type of the deleted data is "master," the entry D_t of the destination server selection table 22 is deleted (from Yes in step B3 to step B4), an ascertainment is made as to whether or not the deleted data correspond to specifics of the registration service table 21 (step B5). When the deleted data do not correspond to the specifics of the registration service table 21, processing is terminated (when No is selected in step B5). However, when the deleted data correspond to the specifics of the registration service table 21 (when the deleted data correspond to the UPDATE message issued from the peer routers 3), addition of the service of interest is again performed.

Specifically, all entries having a service identifier identical with the service identifier D_sid of the deleted data are retrieved from the BGP table and the registration service table 21 (from No in step B5 to step B6). A check is made as to whether or not an entry whose "server type" is "master" is present in the thus-retrieved entries (step B7).

When no entry of "master" type is found, processing is terminated (when No is selected in step B7). When such an entry is found, one entry is added to the destination server selection table 22 (the entry is taken as entry A_t). Specifics of the entries of the retrieved master servers [a service identifier length, a service identifier, a master address, a direct access address, the number of ports (master), and port numbers 1 to "n" (master)], are set (from Yes in step B7 to step B8).

The time determined by addition of a master expiry time to the current time is set in the master expiry time in the entry A_t (step B9). At the server addresses of all the retrieved entries, the distance to the router 3 of interest (the number of hops) is acquired from the routing table (step B10). Specifics of the acquired entry having the minimum number of hops [an optimal address, the number of ports (optimal), and port numbers 1 to "n" (optimal)] are set in the entry A_t (step B11).

When in step B3 the server type of the deleted data is determined not to be "master," a check is made as to whether or not the server address D_addr coincides with an optimal address in the entry D_t (from No in step B3 to step B12). When no coincidence is found, processing is terminated (when No is selected in B12). When coincidence is found, the following processing is performed.

Specifically, all entries having a service identifier identical with the service identifier D_sid of the deleted data are retrieved from the BGP table and the registration service table 21 (from Yes in step B12 to step B13). A distance to the router 3 of interest (the number of hops) is acquired from the routing table at the server addresses of all the retrieved entries (step B14). An entry having the minimum number of hops among the acquired numbers of hops is retrieved, and specifics of the entry D_t; i.e., an optimal address, the number of ports (optimal), and the number of hops 1 to n (optimal), are changed to specifics of the entry having the minimum number of hops (step B15).

More specifically, according to the above updating method, when the peer routers 3 are ascertained to have gone down (BGP4 ascertains life or death of the routers by exchanging the KEEPALIVE message among the peer routes 3; when the KEEPALIVE message is not received, the peer routers 3 are ascertained to have gone down), the information originating from the corresponding routers 3 is deleted from the BPG table. In the thus-deleted state, the routing table is again constructed. At that time, the entries having APP_ATTR_ADDR attribute are deemed to have been deleted in the deleted BGP table, and the deletion processing of the above flow is performed. Thereby, even when the router 3 has stopped (gone down), an optimal destination can be selected according to the status of the network (a change in a network topology) achieved when the router 3 has stopped.

Next, processing pertaining to "master expiry time" will now be described. The term "master expiry time" is processing for stopping the mirror server 2 (causing the mirror server 2 to expire) when the master server 1 has stopped a service (the service has been expired). When the master server 1 has been temporarily suspended, the mirror server 2 must continue the processing. However, when the master server 1 has stopped the service over a long period of time or permanently, the mirror server 2 must also stop the service. For this reason, an expiry time is provided.

Specifically, the router 3 has, as a "master expiry time," a time from when the master server 1 has stopped a service until when the master expires, and performs the following processing. The "master expiry time" can be freely set by the user.

First, the router 3 checks the master expiry times of all the entries in the destination server selection table 22. When the master expiry time is not "0," the current time is compared with the master expiry time. When the master expiry time has passed, the entry is deleted. As a result, service stop processing can be performed by means of the master expiry time.

[D] Embodiment of the Router

Figure 17:
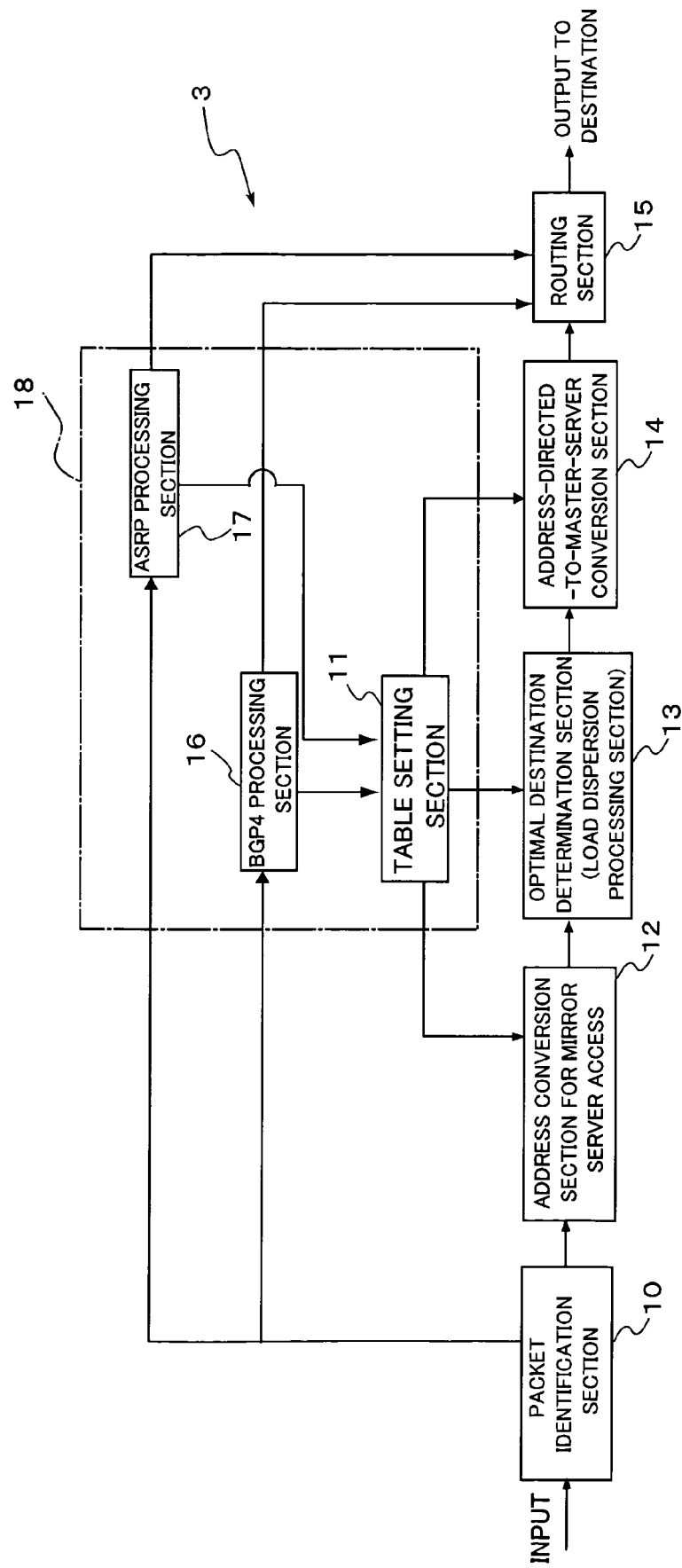
FIG. 17 is a block diagram showing the configuration of the router of the present embodiment.

Next, FIG. 17 shows an embodiment of the router 3 which embodies the above-described processing. FIG. 17 shows the principal section of the present embodiment but does not show the overall configuration of the router. As shown in FIG. 17, each of the routers 3 of the present embodiment comprises a packet identification section 10, a table setting section 11, a mirror server access address conversion section 12, an optimal destination determination section (load distribution processing section) 13, a master-server-directed address conversion section 14, a routing processing section 15, an ASRP processing section 17, a BGP4 processing section 16. The minimum requirement for the ASRP processing section 17 is to be mounted on the routers 3A, 3B connected to the servers 1, 2. This requirement does not always apply to the other routers 3.

The packet identification section 10 has the function of identifying the type of a received packet [an ASRP packet, a BGP4 control packet, (an UPDATE message or the like), or a user packet (a service access request or the like)]. The ASRP packet is delivered to the ASRP processing section 17; the BGP4 control packet is delivered to the BGP4 processing section 16; and the user packet, such as a service access request, is delivered to the mirror server access address conversion section 12.

The BGP4 processing section 16 performs processing for exchanging a message among the previously-described routers 3 by use of the routing protocol such as BGP4. As mentioned above, the BGP4 processing section 16 exchanges a message whose "attribute-type code" has been extended. The ASRP processing section 17 exchanges the ASRP message between the servers 1, 2 connected to the router 3 of interest.

Figure 12:
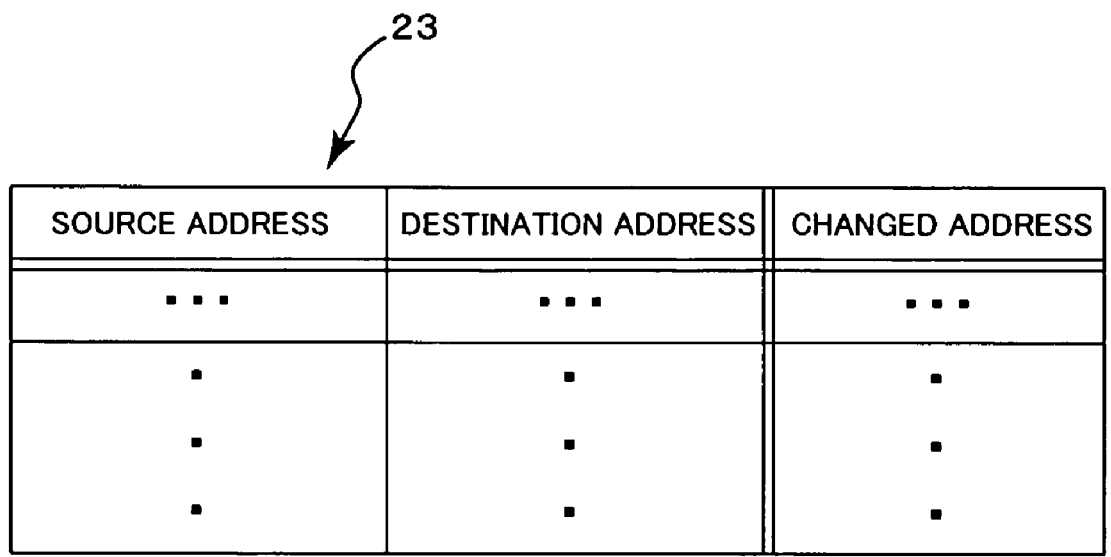
FIG. 12 is a view showing an example master-server-directed change table employed in the present embodiment.

On the basis of the service information acquired by the ASRP processing section 17 and the BGP4 processing section 16, the table setting section 11 sets and manages specifics of the above-described registration service table 21, those of the destination server selection table 22, and those of the BGP4 table; specifics of the master-serve-directed change table 23 (see FIG. 12), those of the optimal destination determination section 13, and those of the destination change table 24 (see FIG. 13), all of which belong to the mirror server access address conversion section 12 to be described later; and specifics of the master server recovery table 25 in the master-server-directed address conversion section 14. In association with updating of the registration service table 21 and the destination server selection table 22, the table setting section 11 issues a command for adding/deleting entries required for the mirror server access address conversion section 12, the optimal destination determination section (the load distribution processing section) 13, and the master-server-directed address conversion section 14. These tables are recorded on a required recording medium, such as RAM or the like.

The table setting section 11, the BGP4 processing section 16, and the ASRP processing section 17 perform the function of the service information management section 18 which receives information concerning service contents provided by the servers 1, 2 connected thereto or information provided by the servers 1, 2 from another router 3, and manages registration and updating of the service information. The BGP4 processing section 16 plays the role of a service information transmission section which, in association with registration and updating of the service information performed by the service information management section 18, transmits the service information further to other routers 3 through use of the routing protocol used in controlling the path among the routers 3.

The table setting section 11 further has the following functions (the function is primarily implemented by the parenthesized section(s)).

(1) A function of retaining and managing service information including a service identifier (URL) which shows a service type provided by the servers 1, 2 (the table setting section 11)

(2) A function of updating service information according to a service operation status of the servers which is reported from the servers 1, 2 by use of the KEEPALIVE packet, the SERVICE_DOWN packet, or the CLOSE_SERVER packet from ASRP (the ASRP processing section 17 and the table setting section 11)

(3) A function of deleting registration of service information concerning service contents when the SERVICE_UPDATE packet (a service-updated message), which is based on ASRP and reported by the servers 1, 2 every time the service contents provided by the servers 1, 2 are updated, is not received for a predetermined period (the ASRP processing section 17, and the table setting section 11)

(4) A function of maintaining registration of service information concerning service contents, which are not objects of updating, even when the SERVICE_UPDATE packet based on ASRP is not received for a predetermined period of time (the ASRP processing section 17, and the table setting section 11)

(5) A function of determining whether or not the master server 1 is suspended for a predetermined period of time by the KEEPALIVE packet (the service operation status notification message) periodically issued by ASRP (the ASRP processing section 17)

(6) A function of deleting registration of service information about the mirror server 2 in the table setting section 11 when the master server 1 is determined to be inoperative by the above function (the table setting section 11)

(7) A function of monitoring operation status conditions of the other routers 3 by monitoring receipt of the KEEPALIVE message (life-and-death ascertainment information) to be periodically received from the other routers 3 by use of BPG4 (the BGP4 processing section 16)

(8) A function of deleting service information about the other suspended router 3 among the service information items owned by the table setting section 11 when the other routers 3 are determined to be inoperative as a result of monitoring of the KEEPALIVE messages by BGP4 (the table setting section 11)

(9) A function of requesting a direct access address which enables a direct access to the master server when the service contents provided to the master server 1 by the mirror server 2 are updated (the ASRP processing section 17)

(10) A function of causing the service information to include the direct access address received from the master server 1 in response to the request and transmitting the service information to the other routers 3 (the BGP4 processing section 16)

Next, the mirror server access address conversion section 12, the optimal destination determination section 13, the master-server-directed address conversion section 14, and the routing processing section 15 realize the function of a routing control section, which selectively changes the destination information (address) concerning the service access request on the basis of the service information (the destination server selection table 22, the master-server-directed change table 23, and the destination change table 24) in the above-described service information management section 18, for every set of service contents (service identifiers), thereby routing the destination information to an optimal destination.

Specifically, the mirror server access address conversion section 12 has the function of, when the mirror server 2 updates service contents, excluding communication to be established with the master server 1 from objects determined as optimal destinations (enabling a direct access to the master server 1). Here, the mirror server access address conversion section 12 has the master-server-directed change table 23 such as that shown in FIG. 12.

A set consisting of a source address, a transmission destination address, and a change address is to be registered as an entry in this master-server-directed change table 23. The address conversion section 12 fetches the source address and the transmission destination address of an input frame, retrieves an entry for which the source address and the transmission destination address of the table 23 coincide with each other, and converts the transmission destination address of the input frame into the change address of the entry (specifically, a "direct access address") when the entry for which the source address and the transmission destination address coincide with each other is found.

Figure 18:
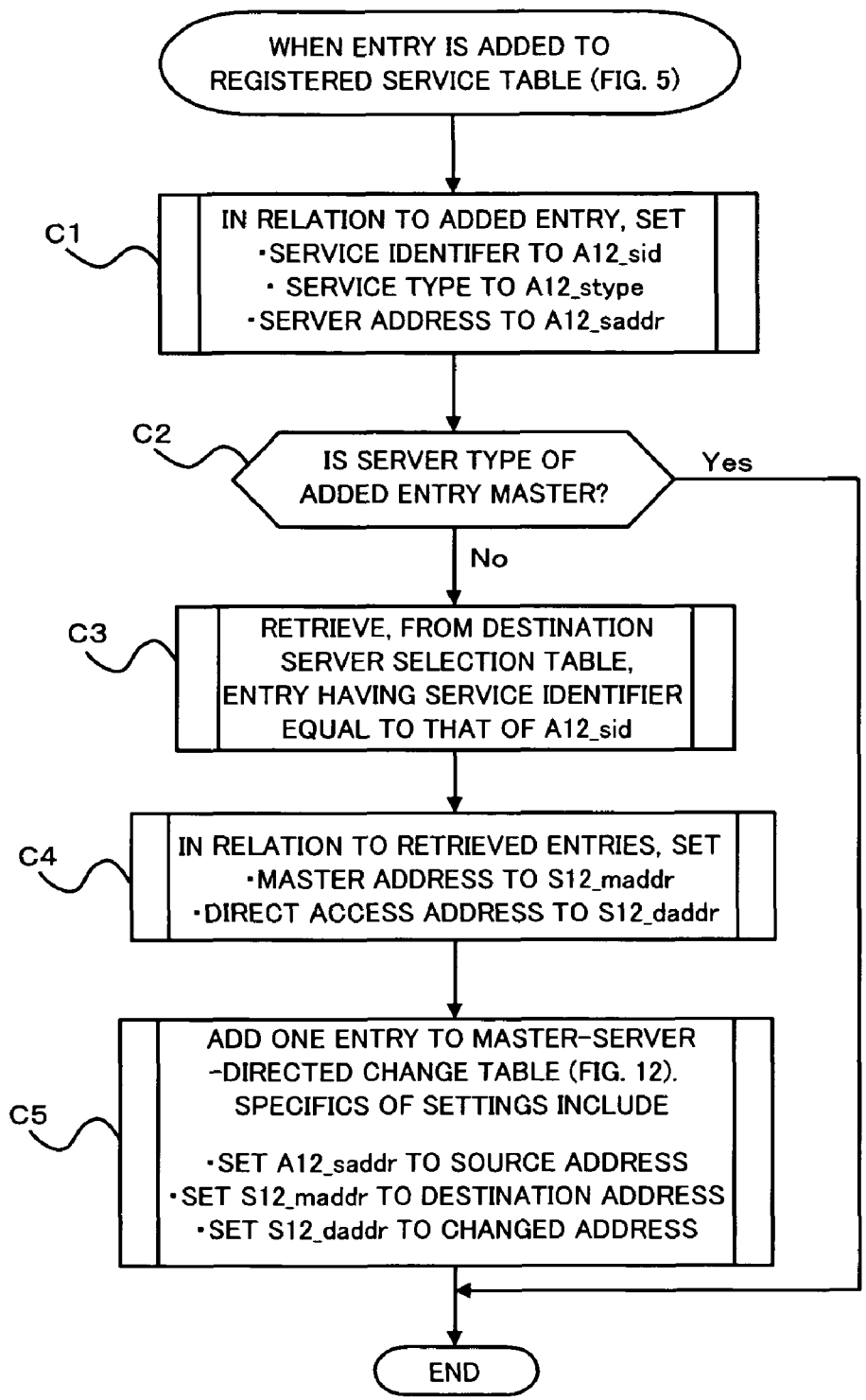
FIG. 18 is a flowchart for describing processing (performed at the time of addition of an entry) for setting a master-server-directed change table belonging to a server access address conversion section of the router shown in FIG. 17.

Processing for adding/deleting an entry of the master-server-directed change table 23 is performed as follows by the table setting section 11. Specifically, when an entry is added to the registration service table 21, the table setting section 11 sets the service identifier of the added entry to A12_sid, the server type of the same to A12_stype, and a server address of the same to A12_saddr (step C1), as shown in FIG. 18. First, a check is made as to whether or not the "server type (A12_stype)" of the added entry is a "master" (step C2).

When the "server type" is "master," the table setting section 11 terminates processing without performing any further processing (when Yes is selected in step C2). When the "server type" is "mirror," an entry having the service identifier A12_sid identical with the added entry is retrieved from the destination server selection table 22 (from No is step C2 to step C3). The "master address (S12_maddr)" and the "direct access address (S12_daddr)" are acquired from the entry (step C4).

One entry is added to the master-server-directed change table 23. In that entry, the server address (A12_saddr) of the added entry, the acquired master address (S12_maddr), and the acquired direct access address (S12_daddr) are set, in this sequence, to the source address, the transmission destination address, and the change address of the master-server-directed change table 23 (step C5).

Figure 19:
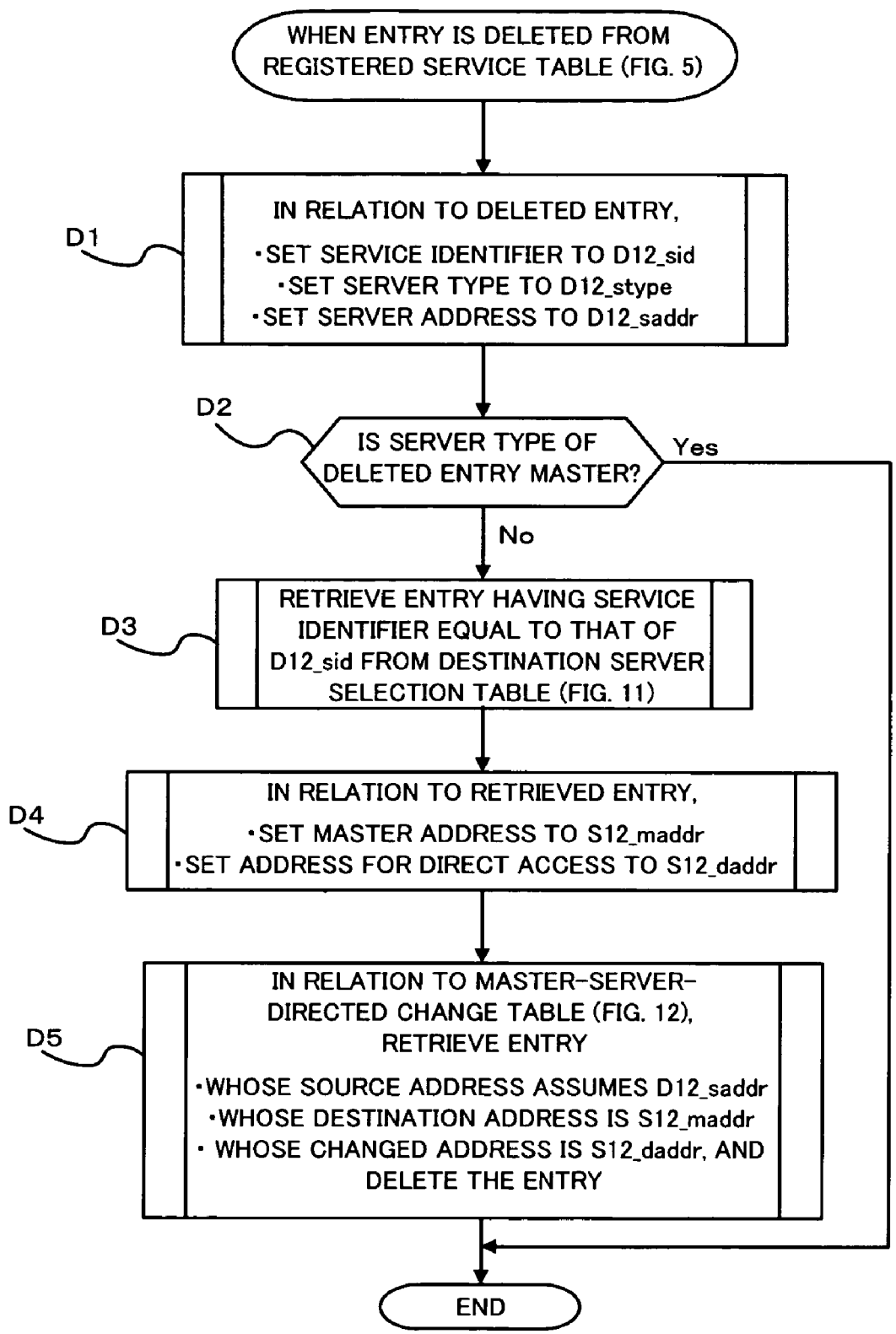
FIG. 19 is a flowchart for describing processing (performed at the time of deletion of an entry) for setting the master-server-directed change table belonging to a server access address conversion section of the router shown in FIG. 17.

In contrast, when an entry is deleted from the registration service table 21, as shown in FIG. 19, the table setting section 11 sets the service identifier of the deleted entry to D12_sid, the server type of the same to D12_stype, and the server address of the same to D12_saddr (step D1). First, a check is made as to whether or not the "server type" of the deleted entry is "master" (step D2).

When the result of the check shows that the "server type" of the deleted entry is "master," the table setting section 11 terminates processing without performing any further processing (when Yes is selected in step D2). When the "server type" of the deleted entry is "mirror," an entry having the service identifier (D12_sid) identical with that of the deleted entry is retrieved from the destination server selection table 23 (from No in step D2 to step D3). The "master address (S12_maddr)" and the "direct access address (S12_daddr)" in the thus-retrieved entry are acquired (step D4).

The table setting section 11 retrieves, from the master-server-directed change table 23, an entry whose source address is D12_saddr, whose transmission destination address is S12_maddr, and whose changed address is S12_daddr, and deletes the thus-retrieved entry (step D5).

Through processing set forth, the destination address of only the frame delivered from the mirror server 2 to the master server 1 is converted into the "direct access address."

Next, when the input frame is addressed to the service of interest, the optimal destination determination section 13 determines changes the input frame to an optimal destination on the basis of the previously-described service information. To this end, the optimal destination determination section 13 has the address change table 24, such as that shown in FIG. 13.

A set consisting of an address (master), a port (master), an address (optimal), and a port (optimal) is to be registered as an entry in this destination change table 24. The optimal destination determination section 13 extracts a transmission destination address and a transmission destination port number of the input frame sent from the mirror server access address conversion section 12, and deems the thus-extracted address and port number as an address (master) and a port (master). An entry having the same specifics is retrieved from the destination change table 24. When an entry is found, the transmission destination address and the transmission destination port number of the input frame are changed to an address (optimal) and a port (optimal) of the destination change table 24, and the thus-changed address and port are output.

As a result, only an access addressed to the master server 1 and assigned to the service thereof is changed to an optimal destination. In relation to a method for retaining information about changes in a destination (the source of a frame and a destination to which the frame has been changed) and for retaining continuation (persistence) of communication (connection) after changes have arisen in the destination change table, a method realized by a known load balancer is applied.

Specifically, addition/deletion of an entry to/from the destination change table 24 is performed by the table setting section 11 as follows.

Figure 20:
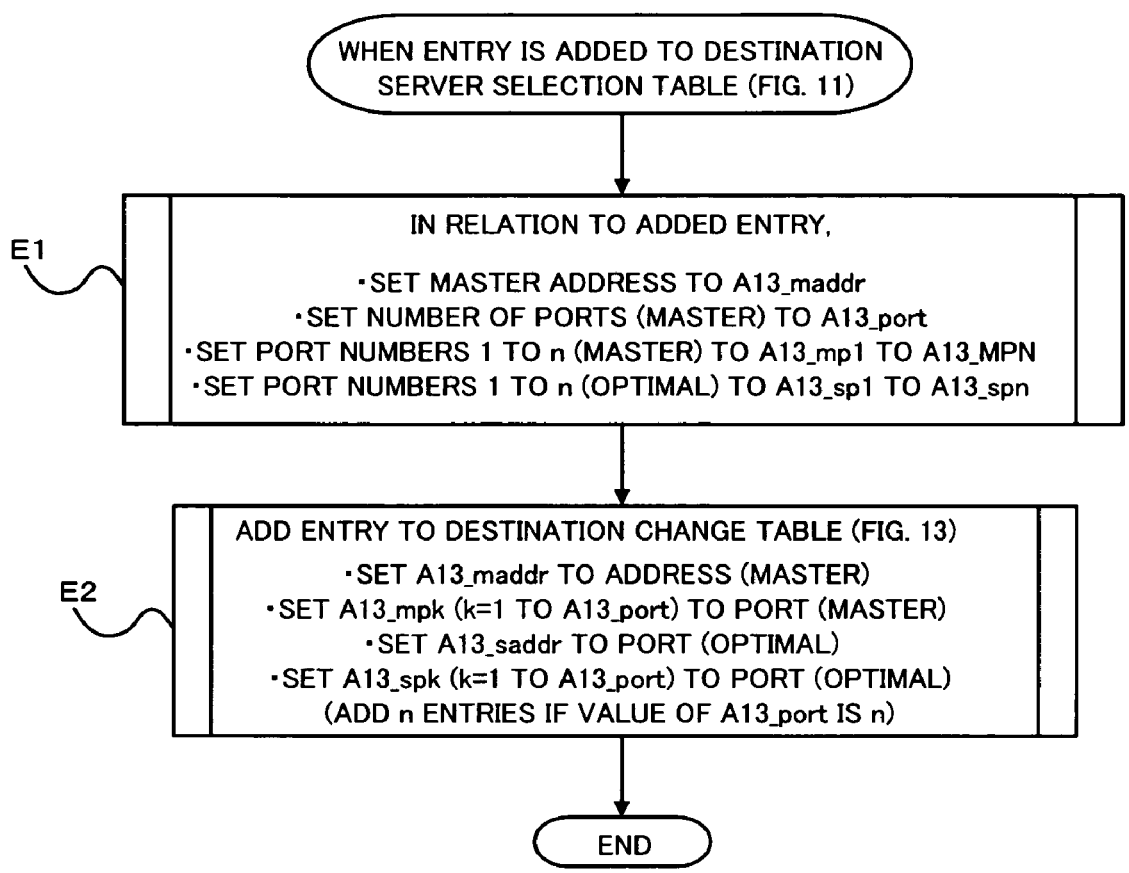
FIG. 20 is a flowchart for describing processing (performed at the time of addition of an entry) for setting a destination change table belonging to the optimal destination determination section of the router shown in FIG. 17.

When an entry is added to the destination server selection table 22, the table setting section 11 sets the master address of the added entry to A13_maddr, the optimal address of the same to A13_saddr, the number of ports (master) of the same to A13_port, port numbers 1 to n (master) of the same to A13_mp1 to A13_mpn, and port numbers 1 to "n" of the same (optimal) to A13_sp1 to A13_spn (step E1), as shown in FIG. 20. One entry is added to the destination change table 24. A13_maddr is set as the address (master) of the added entry of the same; A13_mpk (where "k"=1 to A13_port) is set as a port (master) of the same; A13_saddr is set as an address (optimal) of the same; and A13_spk is set as a port (optimal) of the same. When the number of ports A13_port of the entry added to the destination server selection table 22 is in numbers (n), the above-described processing is performed in sequence with regard to all the ports, and "n" entries are added (step E2).

Figure 21:
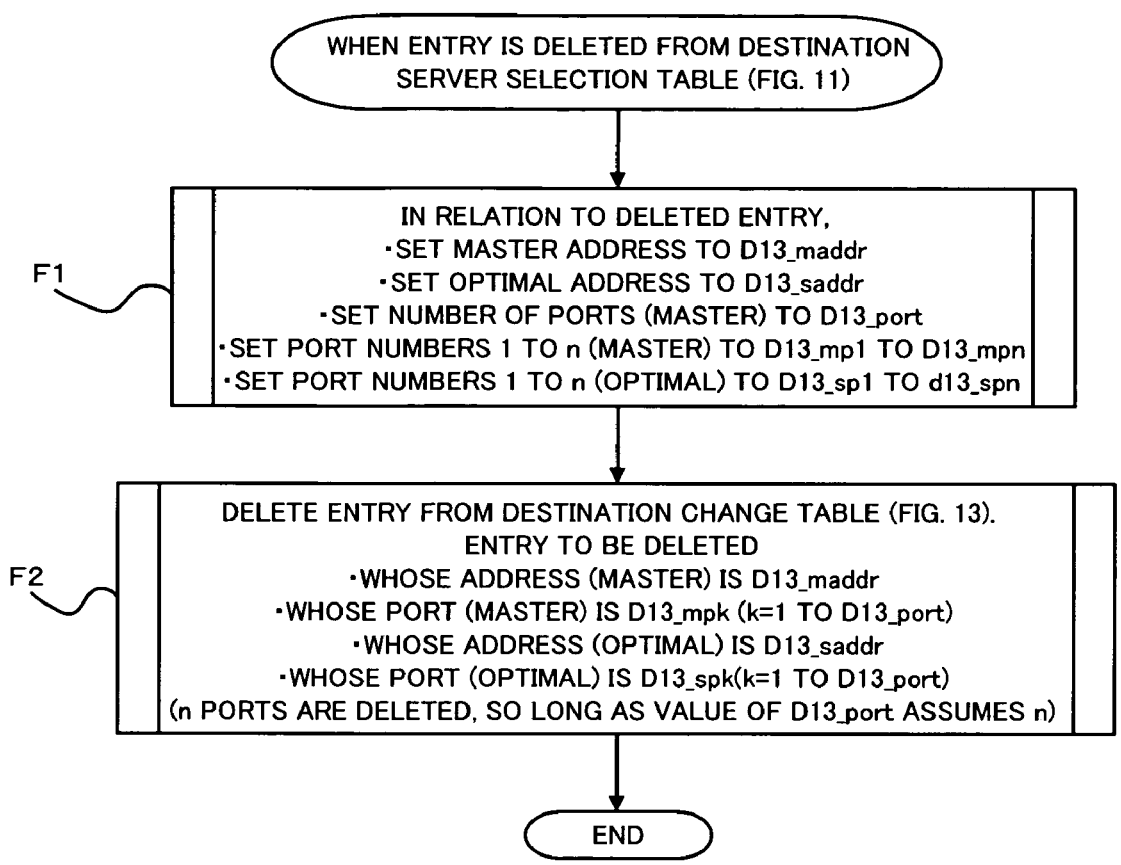
FIG. 21 is a flowchart for describing processing (performed at the time of deletion of an entry) for setting a destination change table belonging to the optimal destination determination section of the router shown in FIG. 17.

When the entry is deleted from the destination server selection table 22, as shown in FIG. 21, the table setting section 11 sets the master address of the deleted entry to D13_maddr, the optimal address of the same to D13_saddr, the number of ports (master) of the same to D13_port, the port numbers 1 to "n" (master) to D13_mp1 to D13_mpn, and port numbers 1 to "n" (optimal) to D13_sp1 to D13_spn (step F1). An entry having the same specifics is retrieved from the destination change table 24, and the entry in the destination change table 24 is deleted (step F2). Even in the case of deletion processing, when ports in the deleted entry are in numbers (n), the above-described processing is sequentially performed with regard to all the ports, to thus delete "n" entries.

Figure 14:
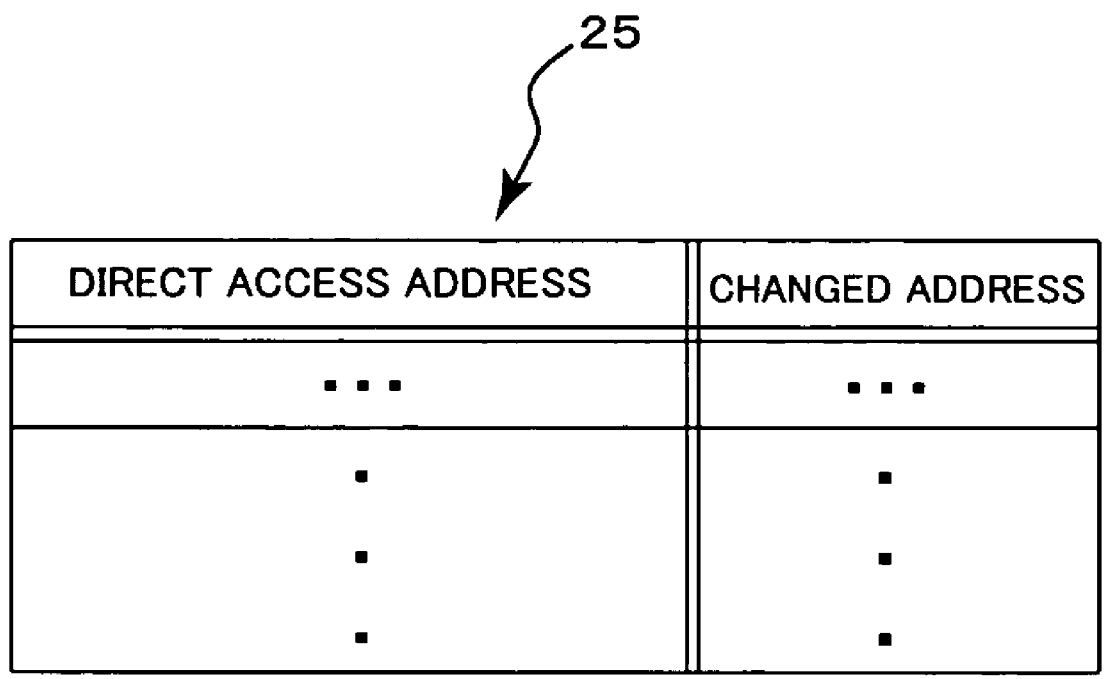
FIG. 14 is a view showing an example master-server-directed recovery table employed in the present embodiment.

The master-server-directed conversion section 14 has the function of changing the input frame to the master address when the input frame is the "direct access address" of the master server 1. The master-server-directed address conversion section 14 has a master-server-directed recovery table 25, such as that shown in FIG. 14.

A set consisting of a direct access address and a changed address is to be registered as an entry in this master-server-directed recovery table 25. The master-server-directed address conversion section 14 extracts a transmission destination address of an input frame sent from the optimal destination determination section, deems specifics of the extracted transmission destination address as the "direct access address" in the master-server-directed recovery table 25, and retrieves an entry having an address identical with the direct access address. When the entry is found, the master-server-directed address conversion section 14 changes the transmission destination address of the input frame to a corresponding changed address in the table 25, and outputs the thus-changed address. As a result, the frame delivered directly to the master server 1 (the frame having the direct access address) is changed to an actual master-server-directed frame.

Figure 22:
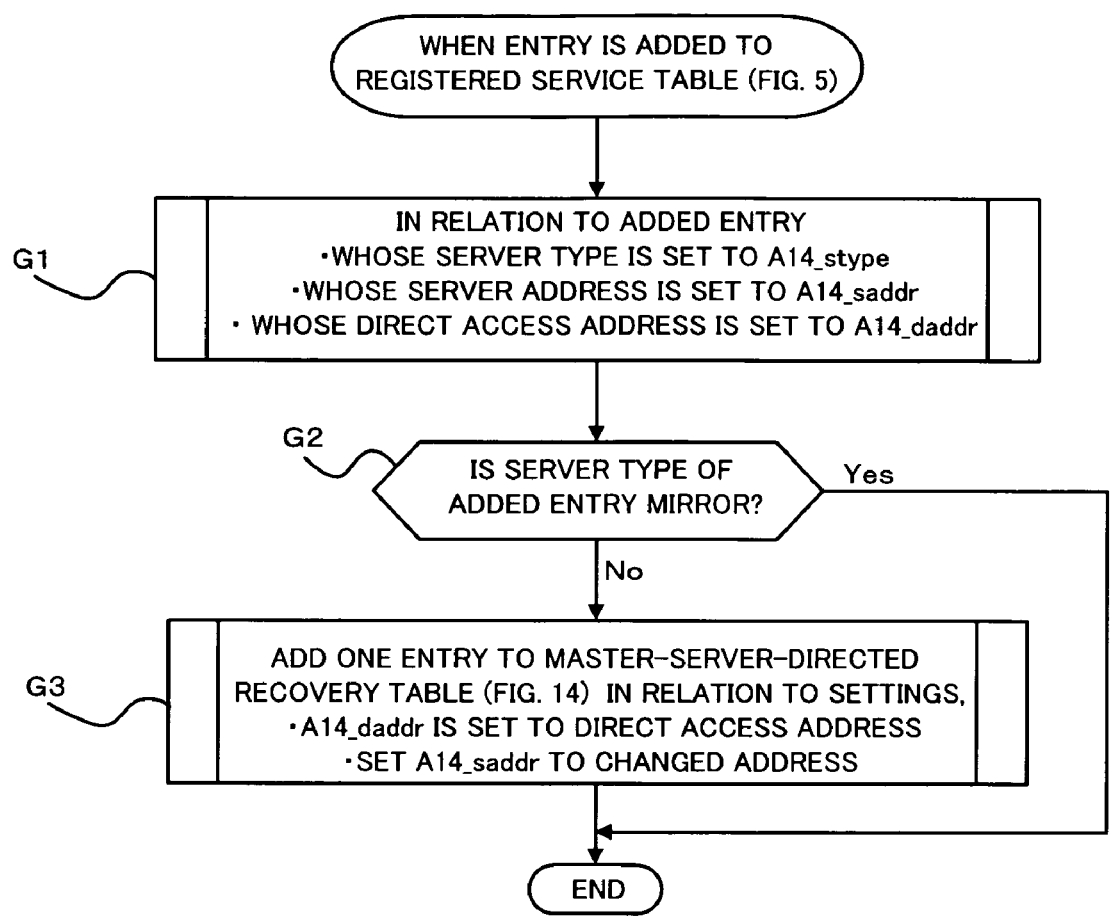
FIG. 22 is a flowchart for describing processing (performed at the time of addition of an entry) for setting a destination change table belonging to the server-directed address conversion section of the router shown in FIG. 17.

The table setting section 11 adds/deletes the entry to/from the master-server-directed recovery table 25 as follows. Specifically, when an entry is added to the registration service table 21, the table setting section 11 sets the server type of the added entry to A14_stype, the server address of the same to A14_saddr, and the direct access address of the same to A14_daddr, as shown in FIG. 22 (step G1). First, a check is made as to whether or not the server type of the added entry is "mirror" (step G2).

Consequently, when the "server type" of the added entry is "mirror," the table setting section 11 terminates processing without performing any further processing (when Yes is selected in step G2). When the "server type" of the added entry is "master," the direct access address (A14_daddr) and the server address (A14_saddr) in the added entry are set as the direct access address and the changed address of the master-server-directed recovery table 25 (from No in step G2 to step G3).

Figure 23:
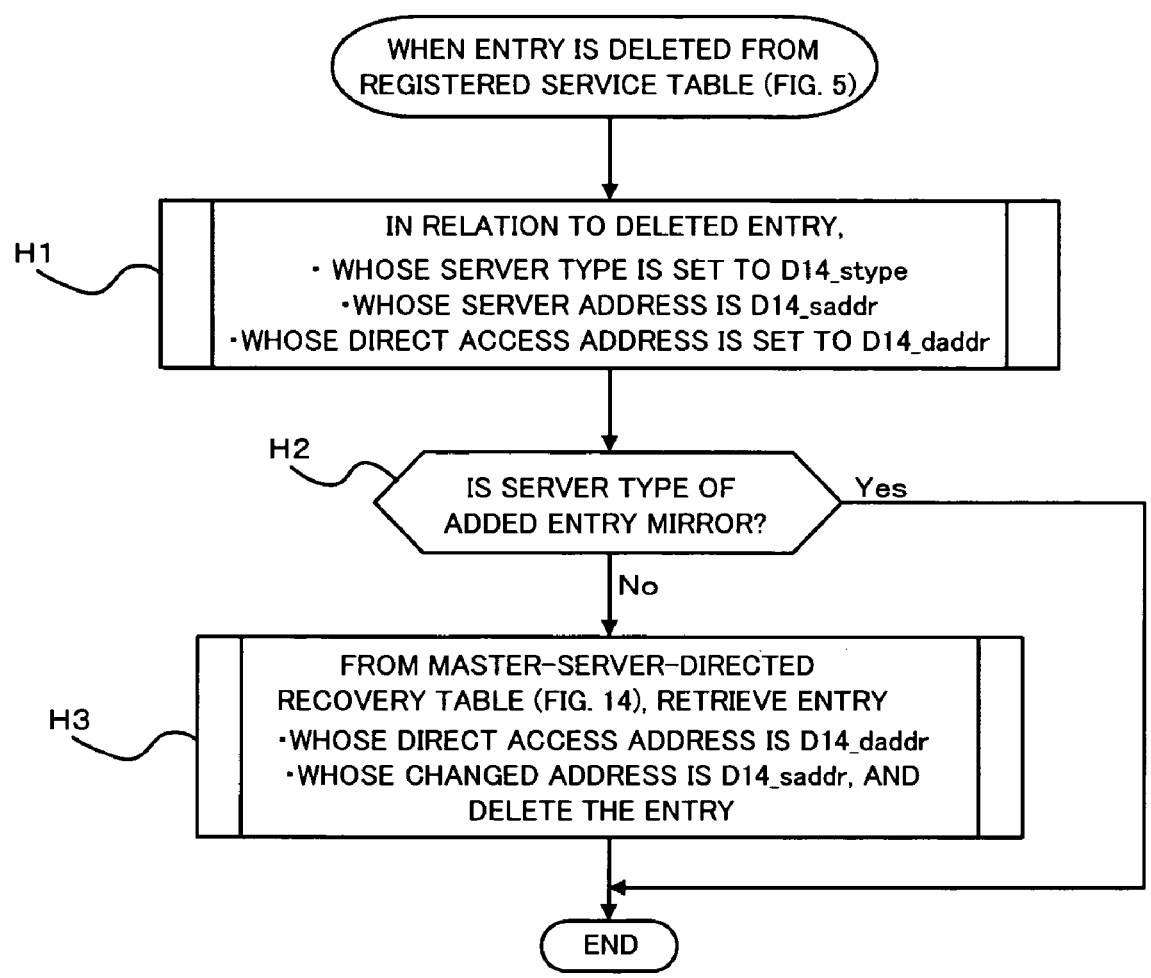
FIG. 23 is a flowchart for describing processing (performed at the time of deletion of an entry) for setting a destination change table belonging to the server-directed address conversion section of the router shown in FIG. 17.

When an entry is deleted from the registration service table 21, the table setting section 11 sets the "server type" of the deleted entry to D14_stype, the server address of the same to D14_saddr, and the direct access address of the same to D14_daddr (step H1), as shown in FIG. 23. First, a check is made as to whether or not the "server type" of the added entry is "mirror" (step H2).

Consequently, the "server type" of the added entry is "mirror," the table setting section 11 terminates processing without performing any further processing (when Yes is selected in step H2). When the "server type" of the deleted entry is "master," an entry having specifics coinciding with the direct access address (D14_daddr) and the server address (D14_saddr) in the deleted entry is retrieved from the master-server-directed recovery table 25. The thus-retrieved entry is deleted from the master-server-directed recovery table 25 (from No in step H2 to step H3).

The routing processing section 15 is for performing routing operation in connection with the frame having been subjected to various modifications in the manner as mentioned previously, on the basis of a predetermined routing table. The routing processing section 15 performs processing identical with or analogous to the routing operation realized by a known router.

[E] Example Operation of Optimal Destination Determination

Figure 24:
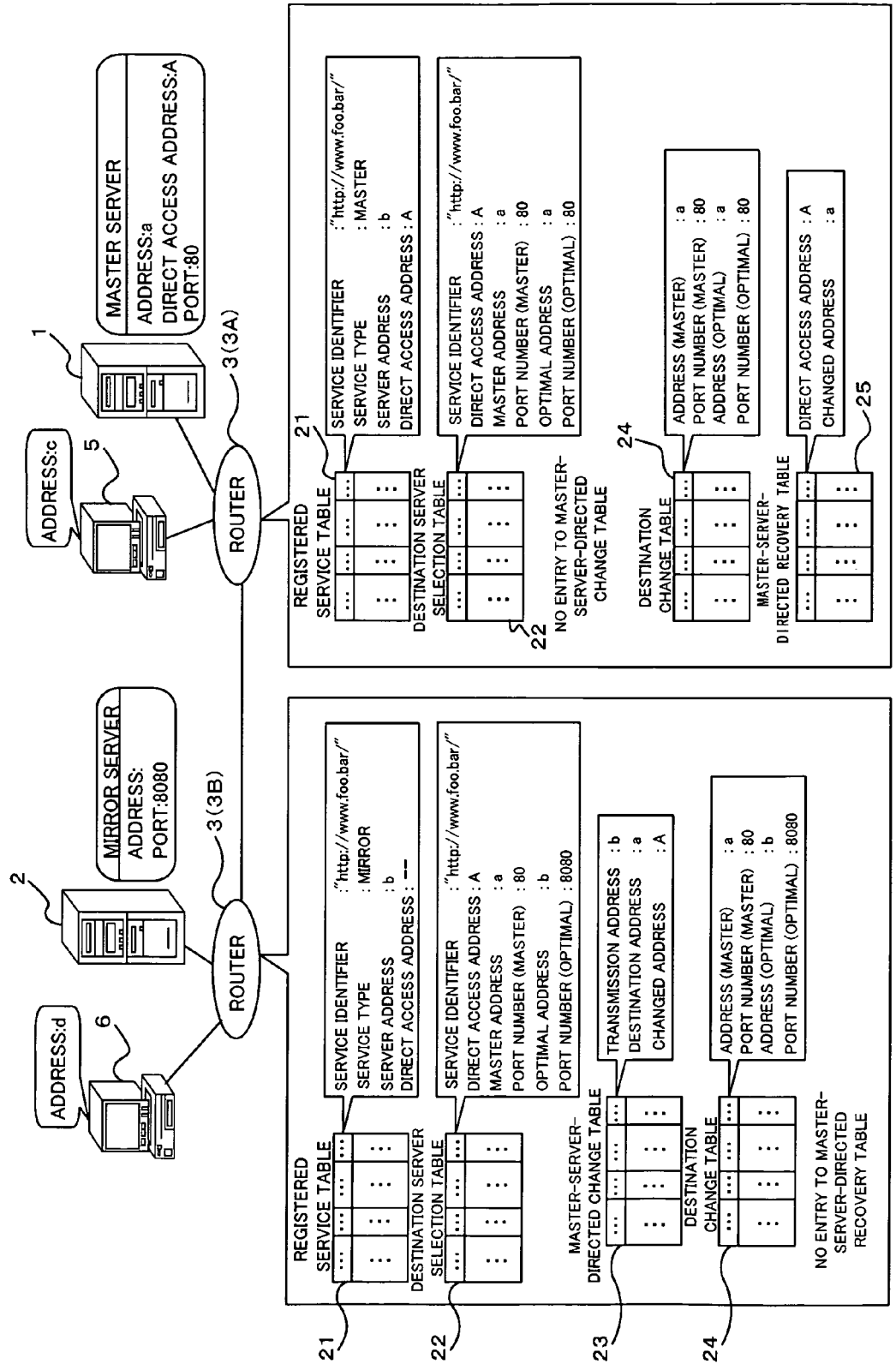
FIG. 24 is a view for describing operation of the network of the present embodiment.

An example of actual operation (optimal destination determination) performed by the function given to the above-described router 3 will be described hereinbelow by reference to FIG. 24. In FIG. 24, the address of the master server 1 is taken as "a"; the direct access address of the same is set to "A"; and the address of the mirror server 2 is taken as "b." Further, the master server 1 and the mirror server 2 are assumed to provide a specific service by means of a certain URL (e.g., "http://www.foo.bar/") which is a service identifier. The master server 1 provides a service at port number=80, and the mirror server 2 provides at port number=8080 the same service as that provided by the master server 1. Moreover, FIG. 24 also shows details of the various tables 21, 22, 23, 24, and 25 in the routers 3A, 3B, which are obtained from the master server 1 and the mirror server 2.

In FIG. 24, when, e.g., the terminal 5 makes an access to the above-described URL, the terminal 5 (whose address is "c") transmits a frame (packet) having a source address="c," a transmission destination address="a," and a port number=80. This packet arrives at the router 3A, and is subjected to destination change processing in the router 3A.

In this case, since the master-server-directed change table 23 in the router 3A has no entry which coincides with the source address="c" and the transmission destination address="a," the mirror server access address conversion section 12 does not perform any address conversion operation, and the received packet is input to the optimal destination determination section 13.

Although the destination of the destination change table 24 is changed by the optimal destination determination section 13, the destination is changed to the same destination in this case. Therefore, the destination is input to the master-server-directed address conversion section 14 while consequently not being converted. Since a hit entry is not found in the master-server-directed recovery table 25, the master-server-directed address conversion section 14 also does not perform any address conversion operation. Accordingly, in this case, the frame is relayed to the address "a" (the master server 1) without modifications.

When a terminal 6 makes an access to the URL, a frame (packet) having a source address="c," a transmission destination address="a," and a port number=80 is transmitted from the terminal 6. The packet arrives at the router 4, and is subjected to destination change processing in the router 3B.

Specifically, since the entry of the master-server-directed change table 23 differs from the source address, no hit is found in the mirror server access address conversion section 12, and address conversion is not performed. Next, an entry for which a source address="a" and a port number=80 are changed to a source address="b" and a port number=8080 exists in the destination change table 24, the optimal destination determination section 13 changes the source address "a" to "b" and the port number "80" to "8080."

Since a corresponding entry is not found in the master-server-directed recovery table 25, the master-server-directed address conversion section 14 does not perform address conversion. Consequently, the source address and the port number are changed to an address="b" and a port number=8080 by the access from the terminal 6, and hence an access is made to the mirror server 2.

As mentioned above, as a result of the destination address of the service access request being selectively changed on the basis of the service information owned by each of the routers 3, the terminal 5, 6 can make an access to the server 1 or 2 by way of the shortest path according to the location (address) of the destination.

Next, processing performed when the mirror server 2 updates web contents of the master server 1 will be described.

In this case, an access to the URL is made from the mirror server 2 to the master server 1. As a result, the mirror server 2 transmits the frame (packet) having a source address="b," a transmission destination address="a," and a port number="80." This packet arrives at the router 3B, and is subjected to destination change processing in the router 3B.

First, in relation to the frame having a source address="b" and a transmission destination address="a," an entry which changes a transmission destination address to "A" is present in the master server change table 23, and hence the mirror sever access address conversion section 12 changes the transmission destination address of the received frame to "A."

Next, although an entry which changes the destination address="a" and the port number=80 is present in the destination change table 24, the destination address has already been changed to "A" by the modifications. Hence, the optimal destination determination section 13 does not detect a hit for this entry. For these reasons, the destination change table 24 does not perform address conversion. Finally, since an entry is not hit in the master server recovery table 25, the master-server-directed address conversion section 14 does not perform any address conversion.

Since the destination address has been changed to "A" by the router 3B as mentioned above, the frame is relayed to the router 3A through routing processing, and the router 3A also performs destination change processing.

First, the mirror server access address conversion section 12 does not perform address conversion, because a hit is not detected in the master-server-directed change table 23. Next, since an entry is not hit in the destination change table 24, the optimal destination determination section 13 does not perform any address conversion, as well. Finally, since an entry which changes the transmission destination address "A" to an address="a" is found in the master-server-directed recovery table 25, the master-server-directed address conversion section 14 changes the transmission destination address of the frame to "a."

As mentioned above, the destination address is changed to "a" in the router 3A, whereby the frame is relayed to the master server 1. Thus, a request for updating service contents issued from the mirror server 2 to the master server 1 is delivered directly to the master server 1 without being subjected to selection of an optimal server such as that mentioned previously.

[F] Effects and Advantages of the Present Embodiment

As mentioned above, according to the present embodiment, information (service information) concerning contents of the service provided by the servers 1, 2 scattered throughout the network is added to the message of BGP4 protocol, which is a routing protocol used among the routers 3, so that the information concerning all services available in the network can be shared throughout the entire network. The routers 3 can automatically ascertain the types and locations of various services provided in the network, and the terminals 5, 6 can effect routing to an optimal destination without becoming aware of the information. Consequently, the load on a specific server (service) is efficiently distributed, thereby preventing concentration of a load.

In the present embodiment, service information is added to the message of the routing protocol exchanged among the routers 3, and hence an optimal destination is determined as occasion demands according to the operation status conditions of the routers 3, and relaying to an optimal destination can be performed at all times. Moreover, service information is exchanged between the servers 1, 2—which provide a service—and the routers 3 by means of ASRP. Even when a server is newly added to the network, there is no necessity for additionally effecting settings on the routers 3. The new server can be automatically added to objects of optimal destination determination.

Since the service information added to ASRP and BGP4 includes a service identifier, the router can ascertain the nature of the services provided by the various types of servers 1, 2. Consequently, the router 3 can perform selection of an individual optimal destination for each service. In the case of http, which is an example of specifics of a service identifier, URLs become different from each other when services fall in the same category "web service" but differ from each other in terms of contents. In this case, the router 3 can ascertain coincidence of service contents by designating a URL as mentioned previously, so that a destination can be individually selected.

In ASRP of the present embodiment, the servers 1, 2 transmit the KEEPALIVE message at a predetermined cycle, and the routers 3 can ascertain operation status conditions of the servers. Accordingly, an optimal path can be updated according to changes in the service operation status while service operation status conditions of the group of servers—which provide services—are ascertained at all times.

When information concerning an object of service content update processing in ASRP of the present embodiment corresponds to objects of processing, and when a notification of service content update set in the router 3 has not been received for a predetermined period of time, the router 3 deletes from the registration service table 21 an entry (service information) of the corresponding server. When the service contents have not been updated for a predetermined period of time, the destination is excluded from the list of destination for relay even when the server is providing the service.

Specifically, when information concerning another group of servers (the mirror server 2) on which the same service contents are reflected is ascertained to be older than the information owned by a provider of a specific service (the master server 1), the destination can be excluded from the objects even when the service is in operation. Consequently, the user (the terminals 5, 6) can make an access to the server which provides updated service contents, at all times without having awareness of the server.

The information concerning objects of service content update processing is notified to the routers by ASRP for each of the servers 1, 2. Therefore, the routers 3 can ascertain as an object of updating/non-object of updating for each of the servers 1, 2. Even in the case of a server—updating of service contents of that server is delayed—, the server is not deleted from the registration service, so long as the server falls outside of objects of service content update processing. Therefore, relaying to that server is continued. As a result, even when the service contents of the mirror server 2 are ascertained to be older than those of the master server 1, the router 3 can make a selection such that the mirror server 2 is not excluded from the objects of destination, so long as no problem arises in provision of that service.

In the present embodiment, a master expiry time is set, and the router 3 deletes service information of interest from the destination server selection table 22 after lapse of a predetermined period of time since the master server 1 has stopped operation. Relaying to the mirror server 2 can also be suspended in accordance with inoperative status of the master server 1. Specifically, when the provider of a specific service (the master server 1) remains inoperative and when this status has continued over a predetermined period of time, all of the services of the mirror server 2 are excluded from objects of destination after lapse of a predetermined period of time even if another group of servers (the mirror server 2) on which the same service contents are reflected are in operation, thereby giving the appearance of suspending provision of the services.

Further, ASRP of the present embodiment is mounted in the servers 1, 2 of the network, so that the service contents of the servers 1, 2 can be reported to the router 3. When service contents are added or deleted, the routers 3 can ascertain addition or deletion of the service contents by means of ASRP. This information is ascertained over the entire network by means of the attribute information added to the routing protocol. Consequently, even when specific service contents are added or deleted, the router 3 automatically ascertains the information. Even when the user terminals 5, 6 utilizing the service do not ascertain the status, access is made to an optimal destination.

Moreover, in the present embodiment, the router 3 notifies the optimal destination determination section 13 of the destination serves 1, 2, ports thereof, an optimal destination corresponding to the servers, and ports thereof. The access from the terminals 5, 6 to the server is relayed after the destination of the access has been converted into an optimal destination. Consequently, the terminals 5, 6 utilizing a service can receive a desired service without having awareness of the location (address) of the service provider and operation status of the same.

In the present embodiment, when a peer router 3 has stopped (when the KEEPALIVE message of BGP4 has broken off), all service information items transmitted (owned) by the peer router 3 are subjected to deletion processing. Therefore, even when an optimal destination has changed as a result of stoppage of the router 3, a destination corresponding to the change can be re-determined. Hence, even when changes have arisen in the network topology according to the operation status of the router 3 in the network, an optimal destination can be selected according to the status achieved after occurrence of the changes.

Moreover, on the basis of the attribute information (a direct access address) added to ASRP and BGP4, the router 3 of the present embodiment prevents communication—which is addressed from the mirror server 2 to the master server 1 by the mirror server access address conversion section 12 and the master-server-directed address conversion section 14—from being subjected to destination conversion performed by the optimal destination determination section 13. When the mirror server 2 makes an access to the master server 1, an optimal destination path is not selected, and communication to the master server 1 is inevitably performed. Consequently, the group of servers (the mirror server 2) on which specific service contents are reflected can reliably, accurately update the service contents provided by the servers.

As has been described, according to the present invention, information concerning service contents, which are provided by the server through use of a routing protocol used among routing nodes in a network, is transmitted. Thereby, information about all services in the network can be automatically shared and updated over the entire network. Hence, a service access can be routed to an optimal destination in the network at all times without a user terminal becoming aware of the types of various services provided in the network and locations of the services. Consequently, a load on the specific service is efficiently distributed, to thus prevent concentration of the load, and the present invention is considered to be a technique which is very useful in the field of network communication.

What is claimed is:

1. A method for optimally routing a specific service in a network having a plurality of servers and a plurality of routing nodes which route service access requests to said servers in accordance with address information assigned to said service access requests, said method comprising:
   on each of said routing nodes,
   managing registering and updating of service information pertaining to service contents provided by said each routing node upon receipt of said service information from a server connected to said each routing node or another routing node; and
   selectively changing address information about said service access requests on the basis of said managed service information owned by said each routing node, to thus route said service access requests.

2. The method for optimally routing a specific service in a network according to claim 1, wherein said service information which includes a service identifier showing a service type provided by said servers is registered or updated in each of said routing nodes through use of a routing protocol, and
   each of said routing nodes route said service access requests for the every service type on the basis of said service identifier.

3. The method for optimally routing a specific service in a network according to claim 2, wherein a URL (Uniform Resource Locator) is used as said service identifier.

4. The method for optimally routing a specific service in a network according to claim 1, wherein said servers notify said routing nodes connected to said servers of a service operating status of said servers, by means of a service operation status notification message;
   said routing nodes update said service information owned by said routing nodes according to a service operation status notified by means of said service operation status notification message; and
   an update of said service information is reflected on said routing nodes in said network respectively by means of a routing protocol.

5. The method for optimally routing a specific service in a network according to claim 4, wherein, when a master server and a mirror server exist as said servers for providing identical service contents, said master server periodically notifies a routing node connected to said master server of said service operation status notification message;

when said routing nodes determine, based on said service operation status notification message, that said master server has stayed inactive for a predetermined period of time, registration of said service information about said mirror server is deleted, and deletion of said service information is transmitted to and reflected on said routing nodes in said network respectively by means of a routing protocol.

6. The method for optimally routing a specific service in a network according to claim 1, wherein said servers transmit a service update message to said routing nodes connected to said servers, every time said service contents provided by said servers are updated;

said routing nodes delete registration of said service information about said service contents when said routing nodes do not receive said service update message from said servers for a predetermined period of time; and deletion of said service information is transmitted to and reflected on respective routing nodes in the network by means of a routing protocol.

7. The method for optimally routing a specific service in a network according to claim 6, wherein, even when said service update message is not received for said predetermined period of time, said routing nodes maintain registration of service information about service contents which are objects of non-updating.

8. The method for optimally routing a specific service in a network according to claim 1, wherein each of said routing nodes monitor an operation status of another routing node by monitoring receipt of dead/alive ascertainment information to be periodically received from the other routing node, through use of a routing protocol; and when the other routing node is ascertained to be inactive, service information about the other routing node among pieces of service information owned by said routing nodes is deleted, and deletion of said service information is transmitted to and reflected on each routing node in said network by means of said routing protocol.

9. The method for optimally routing a specific service in a network according to claim 1, wherein, when a master server and a mirror server exist as said servers for providing identical service contents, said mirror server transmits an access request used for updating service contents provided by said mirror server to a routing node connected to said mirror server, and said routing node converts address information about said access request into direct access address information which enables direct access to said master server, thereby routing said access request.

10. A server used in a network having a plurality of servers and a plurality of routing nodes for routing service access requests from user terminals to said servers in accordance with address information assigned to said service access requests, said server comprising:

a providing unit that provides said user terminals with services; and a service notifier that notifies a routing node connected to said server of service information pertaining to service contents provided by said server, wherein said service information notified to said routing node is used for selectively changing address information about said service access requests to thus route said service access requests, and when a mirror server which provides service contents identical with those provided by said servers exists separately from said servers, said mirror server further comprises a direct access address information notifier which notifies said routing node connected to said server of direct access address information for enabling direct access to said server when service contents provided by said mirror server are updated.

11. The server used in a network according to claim 10, wherein said service notifier further comprises a service update notifier, when said service contents are updated, that notifies said routing node of information pertaining to said updated service contents.

12. The server used in a network according to claim 10, wherein said server further comprises a service operation status notifier that notifies said routing node of a service operation status of said server.

13. A routing node used in a network having a plurality of servers, and a plurality of routing nodes for routing service access requests to said servers in accordance with address information assigned to said service access requests, said routing node comprising:

a service information manager that manages registration and updating of service information pertaining to service contents provided by said routing node upon receipt of said service information from a server connected to said routing node or another routing node;

a service information transmitter which transmits said service information to an additional routing node through use of a routing protocol used in said routing nodes, in response to registration and updating of said service information performed by said service information manager; and a routing controller which selectively changes address information about said service access requests on the basis of said service information in said service information manager, to thus route said service access requests.

14. The routing node used in a network according to claim 13, wherein said service information manager is configured to maintain or manage said service information including a service identifier showing a type of a service provided by said servers; and said routing controller is configured to route said service access requests for every service type on the basis of said service identifier.

15. The routing node used in a network according to claim 14, wherein said service information manager maintains and manages a URL (Uniform Resource Locator) as said service identifier.

16. The routing node used in a network according to claim 13, wherein said service information manager comprises an updating unit that updates said service information according to a service operation status of said servers notified by said servers.

17. The routing node used in a network according to claim 13, wherein said service information manager has a deleting unit that deletes registration of service information about said service contents when a service update message, which is to be issued every time said service contents provided by said servers are updated, has not been received from said servers for a predetermined period of time.

18. The routing node used in a network according to claim 17, wherein said service information manager has a maintaining unit that maintains registration of service information about service contents, which are objects of non-updating, even when said service update message has not been received for said predetermined period of time.

19. The routing node used in a network according to claim 13, wherein, when a master server and a mirror server exist as said servers for providing identical service contents, said service information manager comprises a determining unit that determines whether or not said master server remains inactive for a predetermined period of time, by means of a service operation status notification message periodically issued by said master server; and a deleting unit that deletes registration of said service information about said mirror server of said service information manager when said master server is determined to be inactive.

20. The routing node used in a network according to claim 13, wherein said service information manager comprises a monitoring unit that monitors operation status of another routing node by monitoring receipt of dead/alive ascertainment information to be periodically received from said other routing node by means of said routing protocol; and a deleting unit that deletes service information about said other routing node, among pieces of service information retained by said service information manager, when nonoperation of said other routing node is ascertained through said monitoring operation.

21. The routing node used in a network according to claim 13, wherein, when a master server and a mirror server exist as said servers for providing identical service contents, said service information manager comprises a requesting unit that requests direct access address information which enables direct access to said master server when service contents provided by said mirror server to said master server are updated; and a transmitter that transmits said direct access address information to be received from said master server in response to said request to another routing node including said service information.

22. The routing node used in a network according to claim 21, wherein said routing controller has an address converter that converts address information concerning an access request received from said mirror server into said direct access address information.

* * * * *

UNITED STATES PATENT AND TRADEMARK OFFICE
CERTIFICATE OF CORRECTION

| | |
|---|---|
| PATENT NO. | : 7,929,550 B2 |
| APPLICATION NO. | : 11/248764 |
| DATED | : April 19, 2011 |
| INVENTOR(S) | : Daisuke Namihira et al. |

It is certified that error appears in the above-identified patent and that said Letters Patent is hereby corrected as shown below:

Title Page, add the following:

--(63) Related U.S. Application Data
Continuation of application No. PCT/JP2003/008711,
filed on Jul. 9, 2003--

Signed and Sealed this
Twenty-first Day of February, 2012

David J. Kappos
*Director of the United States Patent and Trademark Office*